United States Patent
Nakano et al.

(10) Patent No.: US 10,590,297 B2
(45) Date of Patent: Mar. 17, 2020

(54) INK JET COMPOSITION SET AND INK JET RECORDING METHOD

(71) Applicant: Seiko Epson Corporation, Tokyo (JP)

(72) Inventors: Keitaro Nakano, Matsumoto (JP); Tsuyoshi Sano, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/139,181

(22) Filed: Sep. 24, 2018

(65) Prior Publication Data

US 2019/0092957 A1    Mar. 28, 2019

(30) Foreign Application Priority Data

Sep. 25, 2017    (JP) ................. 2017-183551

(51) Int. Cl.
| | | |
|---|---|---|
| *C09D 11/40* | (2014.01) | |
| *C09D 11/54* | (2014.01) | |
| *C09D 11/38* | (2014.01) | |
| *C09D 11/322* | (2014.01) | |
| *B41J 2/21* | (2006.01) | |
| *C09D 11/107* | (2014.01) | |
| *C09D 11/037* | (2014.01) | |
| *B41J 11/00* | (2006.01) | |
| *C09D 11/101* | (2014.01) | |

(52) U.S. Cl.
CPC ............. *C09D 11/54* (2013.01); *B41J 2/2114* (2013.01); *B41J 11/0015* (2013.01); *C09D 11/037* (2013.01); *C09D 11/101* (2013.01); *C09D 11/107* (2013.01); *C09D 11/322* (2013.01); *C09D 11/38* (2013.01); *C09D 11/40* (2013.01)

(58) Field of Classification Search
CPC ....... C09D 11/54; C09D 11/40; C09D 11/322; C09D 11/38; C09D 11/101; C09D 11/037; C09D 11/107; B41J 2/2114; B41J 11/0015

See application file for complete search history.

(56) References Cited

U.S. PATENT DOCUMENTS

| | | | | |
|---|---|---|---|---|
| 6,596,445 | B1 * | 7/2003 | Matsumoto | C07C 251/66 430/7 |
| 2007/0046764 | A1 * | 3/2007 | Nakazawa | B41J 11/002 347/224 |
| 2012/0147095 | A1 * | 6/2012 | Miura | C09D 11/101 347/47 |
| 2013/0286095 | A1 * | 10/2013 | Wada | B41J 11/002 347/43 |

FOREIGN PATENT DOCUMENTS

| | | |
|---|---|---|
| EP | 2636709 A1 | 9/2013 |
| EP | 2813372 A2 | 12/2014 |
| JP | 2015-061921 A | 4/2015 |

OTHER PUBLICATIONS

Extended European Search Report for Patent Application No. EP 18196388.5, dated Dec. 19, 2018 (5 pages).

* cited by examiner

*Primary Examiner* — Yaovi M Ameh

(74) *Attorney, Agent, or Firm* — Harness, Dickey & Pierce, P.L.C.

(57) ABSTRACT

An ink jet composition set includes a radiation-curable color composition, which contains a perinone-based pigment, a polymerizable compound and a polymerization initiator, and a radiation-curable clear composition, which contains an ultraviolet absorber, a polymerizable compound, and a polymerization initiator.

19 Claims, No Drawings

INK JET COMPOSITION SET AND INK JET RECORDING METHOD

BACKGROUND

1. Technical Field

The present invention relates to an ink jet composition set and an ink jet recording method.

2. Related Art

In recent years, in order to form an image having high water resistance, solvent resistance, scratch resistance, and the like on the surface of a recording medium, radiation-curable ink compositions which are cured when irradiated with radiation have been used in ink jet recording methods. For example, JP-A-2015-061921 discloses a photocurable ink jet ink composition containing 40% by mass or more and 75% by mass or less of a specific monomer as a polymerizable compound, 1% by mass or more and 20% by mass or less of a urethane (meth)acrylate oligomer, and a photopolymerization initiator.

When investigating the use of multiple colors, it was found that, in radiation-curable ink compositions, pigments for expressing orange tend to be inferior in light fastness in a case of being compared with pigments having different hues such as cyan, magenta, and yellow, and that, among these orange-expressing pigments, perinone-based pigments such as C.I. Pigment Orange 43 have good light fastness in a case of being compared with pigments of the same hue. However, the light fastness is not sufficient in a case of being compared with pigments of different hues, for example, such as cyan, magenta, and yellow. Therefore, in a case where recording is performed using an ink composition containing a perinone-based pigment together with ink compositions of other hues, the image quality may deteriorate due to changes in the hue of the recorded matter due to discoloration (color fading or the like) of the perinone-based pigment.

In addition, particularly in applications where recorded matter is used outdoors, the light fastness of perinone-based pigments such as C.I. Pigment Orange 43 is still insufficient and there is a concern that deterioration in the image quality of recorded matter due to discoloration may occur even with recorded matter using an ink composition containing a perinone-based pigment as a single color.

SUMMARY

An advantage of some aspects of the invention is to provide an ink jet composition set able to obtain recorded matter which includes a perinone-based pigment and which is excellent in light fastness and color developing properties, and an ink jet recording method.

The invention can be realized in the following aspects or application examples.

According to an aspect of the invention, there is provided an ink jet composition set including a radiation-curable color composition, which contains a perinone-based pigment, a polymerizable compound and a polymerization initiator, and a radiation-curable clear composition, which contains an ultraviolet absorber, a polymerizable compound, and a polymerization initiator.

According to such an ink jet composition set, it is possible to sufficiently cure the radiation-curable color composition and the radiation-curable clear composition. In addition, in a case where the radiation-curable clear composition is used together with the radiation-curable color composition, color fading of the perinone-based pigment is suppressed by the ultraviolet ray shielding effect by the ultraviolet absorber included in the radiation-curable clear composition. Due to this, it is possible to obtain recorded matter including a perinone-based pigment having good light fastness and color developing properties.

In the ink jet composition set, at a concentration contained in the radiation-curable clear composition, a light absorbance of the ultraviolet absorber at a wavelength of 380 nm or more and 430 nm or less may be smaller than a light absorbance of the polymerization initiator in the radiation-curable clear composition.

According to such an ink jet composition set, absorption by the ultraviolet absorber is small in the wavelength range of ultraviolet rays for activating the polymerization initiator in the radiation-curable clear composition. Therefore, it is possible to more sufficiently cure the radiation-curable clear composition and, in a case where the radiation-curable clear composition is used together with the radiation-curable color composition, color fading of the perinone-based pigment is suppressed by the ultraviolet ray shielding effect by the ultraviolet absorber.

In the ink jet composition set, the ultraviolet absorber may be one or more kinds selected from hydroxyphenyl benzotriazole, hydroxyphenyl triazine, hydroxybenzophenone, and oxalic anilide.

According to such an ink jet composition set, absorption by the ultraviolet absorber is small in the wavelength range of ultraviolet rays for activating the polymerization initiator in the radiation-curable clear composition. Therefore, it is possible to more sufficiently cure the radiation-curable clear composition and, in a case where the radiation-curable clear composition is used together with the radiation-curable color composition, color fading of the perinone-based pigment is further suppressed by the ultraviolet ray shielding effect by the ultraviolet absorber.

In the ink jet composition set, a content of the ultraviolet absorber in the radiation-curable clear composition may be 0.1% by mass or more and 10% by mass or less with respect to a total mass of the composition.

According to such an ink jet composition set, it is possible to more sufficiently cure the radiation-curable clear composition and, in a case where the radiation-curable clear composition is used together with the radiation-curable color composition, color fading of the perinone-based pigment is further suppressed by the ultraviolet ray shielding effect by the ultraviolet absorber.

In the ink jet composition set, the radiation-curable color composition may contain an ultraviolet absorber.

According to such an ink jet composition set, since the radiation-curable color composition itself includes an ultraviolet absorber, color fading of the perinone-based pigment is further suppressed by the ultraviolet ray shielding effect by the ultraviolet absorber.

In the ink jet composition set, the polymerization initiator in the radiation-curable clear composition may be an acylphosphine oxide compound.

According to such an ink jet composition set, it is possible to more sufficiently cure the radiation-curable clear composition.

In the ink jet composition set, a content of the polymerization initiator in the radiation-curable color composition may be larger than a content of the polymerization initiator in the radiation-curable clear composition.

According to such an ink jet composition set, since the hue of the radiation-curable color composition is close to the hue of the polymerization initiator, the polymerization initiator has little influence on the coloring and using more of the polymerization initiator makes it possible to have better curability.

In the ink jet composition set, a content of the polymerization initiator in the radiation-curable clear composition may be 6% by mass or less.

According to such an ink jet composition set, it is possible to further suppress coloring of the radiation-curable clear composition.

In the ink jet composition set, a hydroxyl group-containing monofunctional (meth)acrylate may be contained as the polymerizable compound in the radiation-curable clear composition.

According to such an ink jet composition set, it is possible to sufficiently cure the radiation-curable clear composition even if the content of the polymerization initiator is kept low.

In the ink jet composition set, a monomer represented by General Formula (I) may be contained as the polymerizable compound in the radiation-curable color composition.

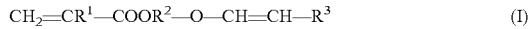

$$CH_2=CR^1-COOR^2-O-CH=CH-R^3 \quad (I)$$

(In Formula (I), $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.)

According to such an ink jet composition set, it is possible to further improve the curability of the coating film.

In the ink jet composition set, hydroxyphenyl benzotriazole and hydroxyphenyl triazine may be included as the ultraviolet absorber in the radiation-curable clear composition, and a content ratio of the hydroxyphenyl benzotriazole and hydroxyphenyl triazine may be a mass ratio of 2 or more and 4 or less of hydroxyphenyl triazine with respect to 1 of hydroxyphenyl benzotriazole.

According to such an ink jet composition set, it is easy to balance the absorption of ultraviolet rays in a relatively long wavelength region by the hydroxyphenyl benzotriazole with the absorption of ultraviolet rays in a relatively short wavelength region by the hydroxyphenyl triazine, and in a case where the radiation-curable clear composition is used together with the radiation-curable color composition, color fading of the perinone-based pigment is further suppressed by the ultraviolet ray shielding effect by the ultraviolet absorber.

In the ink jet composition set, as the polymerizable compound in the radiation-curable color composition, a monofunctional (meth)acrylate may be contained in a total of 40% by mass or more with respect to a total mass of the composition.

According to such an ink jet composition set, it is possible to further increase the stretchability of the cured product of the radiation-curable color composition, and to also improve the weather resistance.

In the ink jet composition set, as the polymerizable compound in the radiation-curable color composition, a content of the bifunctional or higher functional (meth)acrylate may be 20% by mass or less with respect to the total mass of the composition.

According to such an ink jet composition set, it is possible to further increase the stretchability of the cured product of the radiation-curable color composition, and to also improve the weather resistance.

The ink jet composition set may further include a radiation-curable color composition, which contains one or more kinds selected from C.I. Pigment Yellow 155, C.I. Pigment Yellow 74, and C.I. Pigment Yellow 150, a polymerizable compound, and a polymerization initiator, a radiation-curable color composition, which contains C.I. Pigment Red 122, a polymerizable compound, and a polymerization initiator, and a radiation-curable color composition, which contains C.I. Pigment Blue 15:3, a polymerizable compound, and a polymerization initiator.

According to such an ink jet composition set, since the light fastness of each radiation-curable color composition is balanced, hue changes do not easily occur in the recorded image.

According to another aspect of the invention, there is provided an ink jet recording method including attaching the radiation-curable color composition described above and then attaching the radiation-curable clear composition to an attachment region of the radiation-curable color composition.

According to such an ink jet recording method, it is possible to sufficiently cure the radiation-curable color composition and the radiation-curable clear composition. In addition, since the radiation-curable clear composition is attached to the attachment region of the radiation-curable color composition, color fading of the perinone-based pigment is suppressed by the ultraviolet ray shielding effect by the ultraviolet absorber included in the radiation-curable clear composition. Due to this, it is possible to obtain recorded matter including a perinone-based pigment having good light fastness and color developing properties.

In this specification, a case of referring to a "region" indicates a portion which occupies a constant area on a recording medium in which the attachment amount of the composition attached to the region is substantially constant. One region is a region which is visually recognizable as the same color by visual observation, and has an area of, for example, 1 mm² or more. In addition, when the attachment amount is substantially constant, the attachment amount of the composition strictly differs between the positions where the dots of the composition are deposited and the positions where the dots are not deposited, for example, in a case where the duty is low, but the region means a macroscopic range larger than the area of one dot and the attachment amount of the composition is macroscopically constant within the region and attachment amount unevenness due to the presence or absence of dots is ignored.

In addition, in a case where the duty is low, even in a region where both the color composition and the clear composition are attached, microscopic portions may be present in which the color dots and the clear dots do not overlap (for example, on the scale of droplets (landing dots) in the ink jet method); however, the presence of portions in which the dots do not overlap in a case of viewing the dot units is ignored by viewing the portion macroscopically as a laminate of the composition. Accordingly, the attachment region here is considered as a region in which the color composition and the clear composition are laminated throughout the whole region.

Further, in this specification, referring to "composition" indicates "one kind or two or more kinds of each of the radiation-curable color composition and radiation-curable clear composition". In addition, "C.I." is an abbreviation of a color index name and, in the present specification, C.I. Pigment Orange 43 may be abbreviated as "POr 43".

DESCRIPTION OF EXEMPLARY EMBODIMENTS

A description will be given below of several embodiments of the invention. The embodiments described below explain one example of the invention. The invention is not limited to the below embodiments at all and includes various kinds of modifications which are carried out in a range not changing the gist of the invention. Note that not all of the configurations described below are necessarily essential configurations of the invention.

A description will be given below of the radiation-curable color composition and radiation-curable clear composition which are able to be included in the ink jet composition set of the present embodiment, and then a description will be given of embodiments of the ink jet composition set.

1. Radiation-Curable Composition 1.1. Radiation-Curable Color Composition

The radiation-curable color composition which is able to be included in the ink jet composition set of the present embodiment contains a coloring material, a polymerizable compound, and a polymerization initiator.

1.1.1. Coloring Material

The radiation-curable color composition according to the present embodiment includes a coloring material. The radiation-curable color composition according to the present embodiment including a coloring material makes use as a colored ink possible. It is possible to use at least one of a pigment and a dye as the coloring material.

Pigment

Using a pigment as a coloring material makes it possible to improve the light fastness of the radiation-curable color composition. As the pigment, it is possible to use both inorganic pigments and organic pigments.

As inorganic pigments, it is possible to use carbon black (C.I. Pigment Black 7) kinds such as furnace black, lamp black, acetylene black, and channel black, iron oxide, and titanium oxide.

Examples of organic pigments include azo pigments such as insoluble azo pigments, condensed azo pigments, azo lakes, and chelate azo pigments, polycyclic pigments such as phthalocyanine pigments, perylene and perinone pigments, anthraquinone pigments, quinacridone pigments, dioxane pigments, thioindigo pigments, isoindolinone pigments, and quinophthalone pigments, dye chelates (for example, basic dye type chelates, acidic dye type chelates, and the like), dye lake (basic dye type lakes, acidic dye type lakes), nitro pigments, nitroso pigments, aniline black, and daylight fluorescent pigments.

More specifically, examples of the carbon black used in the black composition include No. 2300, No. 900, MCF 88, No. 33, No. 40, No. 45, No. 52, MA 7, MA 8, MA 100, No. 2200B, and the like (the above are manufactured by Mitsubishi Chemical Corp.), Raven 5750, Raven 5250, Raven 5000, Raven 3500, Raven 1255, Raven 700, and the like (the above are manufactured by Carbon Columbia Co., Ltd.), Regal 400 R, Regal 330 R, Regal 660 R, Mogul L, Monarch 700, Monarch 800, Monarch 880, Monarch 900, Monarch 1000, Monarch 1100, Monarch 1300, Monarch 1400, and the like (manufactured by Cabot Japan K.K.), Color Black FW 1, Color Black FW 2, Color Black FW 2V, Color Black FW 18, Color Black FW 200, Color Black 5150, Color Black 5160, Color Black 5170, Printex 35, Printex U, Printex V, Printex 140U, Special Black 6, Special Black 5, Special Black 4A, and Special Black 4 (the above are manufactured by Degussa).

Examples of pigments used in a white composition include C.I. Pigment White 6, 18, and 21.

Examples of pigments used in the yellow composition include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

Examples of pigments used in the magenta composition include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 194, 202, 209, 219, 224, and 245, or C.I. Pigment Violet 19, 23, 32, 33, 36, 38, 43, and 50.

Examples of pigments used in the cyan composition include C.I. Pigment Blue 1, 2, 3, 15, 15:1, 15:2, 15:3, 15:34, 15:4, 16, 18, 22, 25, 60, 65, and 66; C.I. Vat Blue 4, and 60.

In addition, examples of pigments other than magenta, cyan, and yellow include C.I. Pigment Green 7 and 10, C.I. Pigment Brown 3, 5, 25, and 26, C.I. Pigment Orange 1, 2, 5, 7, 13, 14, 15, 16, 24, 34, 36, 38, 40, 43, and 63.

These pigments may be used singly or in a combination of two or more kinds. In addition, in a case where a pigment described above is used, the average particle size thereof is preferably 300 nm or less, and more preferably 50 nm or more and 200 nm or less. When the average particle size is within the range described above, the reliability such as the discharge stability and the dispersion stability of the composition is superior and it is possible to form an image with excellent image quality. Here, the average particle size in this specification is measured by a dynamic light scattering method.

Dye

It is possible to use a dye as a coloring material. The dye is not particularly limited, and it is possible to use acid dyes, direct dyes, reactive dyes, and basic dyes. Examples of dyes include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct black 19, 38, 51, 71, 154, 168, 171, and 195, C.I. Reactive Red 14, 32, 55, 79, and 249, C.I. Reactive Black 3, 4, and 35.

The dyes described above may be used singly, or two or more kinds thereof may be used in combination. Furthermore, the dyes may be used in combination with a pigment.

The total content of the coloring materials is preferably 1% by mass or more and 20% by mass or less with respect to the total mass (100% by mass) of the radiation-curable color composition.

1.1.2. Polymerizable Compound

The radiation-curable color composition contains a polymerizable compound. The polymerizable compound is not particularly limited as long as the polymerizable compound is a compound able to be polymerized using a polymerization initiator, and examples thereof include various monomers and oligomers, which may be monofunctional, bifunctional, trifunctional, or higher polyfunctional.

The monofunctional monomer is not particularly limited, and it is possible to use a monofunctional monomer known in the related art and having a polymerizable functional group, particularly, having a polymerizable functional group having an unsaturated double bond between carbons.

Specific examples of monofunctional monomers include unsaturated carboxylic acids such as (meth)acrylic acid, itaconic acid, crotonic acid, isocrotonic acid, and maleic acid; salts of such unsaturated carboxylic acids; esters, urethanes, amides, and anhydrides of unsaturated carboxylic acid; acrylonitrile, styrene, various unsaturated polyesters, unsaturated polyethers, unsaturated polyamides, unsaturated urethanes; N-vinyl compounds such as N-vinylformamide, N-vinylcarbazole, N-vinylacetamide, N-vinylpyrrolidone, and N-vinylcaprolactam (NVC); and acrylamides such as dimethylacrylamide (DMAA) and dimethylaminoethyl acrylate benzyl chloride quaternary salt (DMAEA). These monofunctional monomers may be used singly, or two or more kinds thereof may be used in combination.

In the present specification, "(meth)acryloyl" means at least any one of acryloyl and the corresponding methacryloyl, "(meth)acrylate" means at least any one of acrylate and the corresponding methacrylate, and "(meth)acrylic" means at least any one of acrylic and the corresponding methacrylic.

Examples of monofunctional (meth)acrylates include isoamyl(meth)acrylate, stearyl(meth)acrylate, lauryl(meth)acrylate, octyl(meth)acrylate, decyl(meth)acrylate, isodecyl (meth)acrylate (IDA), isomyristyl(meth)acrylate, isostearyl (meth)acrylate, 2-hydroxybutyl(meth)acrylate, butoxyethyl (meth)acrylate, tetrahydrofurfuryl(meth)acrylate, isobornyl (meth)acrylate, 2-hydroxyethyl(meth)acrylate, 2-hydroxypropyl(meth)acrylate, lactone-modified flexible (meth)acrylate, t-butyl cyclohexyl(meth)acrylate, dicyclopentanyl(meth)acrylate, dicyclopentenyloxyethyl(meth) acrylate, 2-(meth)acrylic acid-1,4-dioxaspiro[4,5]decy-2-yl-methyl, and the like.

Among these monofunctional monomers, monofunctional (meth)acrylic acid esters, that is, monofunctional (meth) acrylates, are preferable from the viewpoint of improving the stretchability and curability of the cured products of the radiation-curable color composition.

In addition, as a polymerizable compound, the radiation-curable color composition more preferably contains a total of 40% by mass or more of the monofunctional (meth)acrylate with respect to the total mass of the radiation-curable color composition. In this manner, it is possible to further increase the stretchability of the cured product of the radiation-curable color composition and also to improve the weather resistance.

Examples of difunctional (meth)acrylates include diethylene glycol di(meth)acrylate, triethylene glycol di(meth)acrylate, tetraethylene glycol di(meth)acrylate, polyethylene glycol di(meth)acrylate, dipropylene glycol di(meth)acrylate (DPGD(M)A), tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth) acrylate, dimethylol-tricyclodecane di(meth)acrylate, ethylene oxide (EO) adduct di(meth)acrylate of bisphenol A, propylene oxide (PO) adduct di(meth)acrylate of bisphenol A, hydroxypivalic acid neopentyl glycol di(meth)acrylate, and polytetramethylene glycol di(meth)acrylate.

Examples of trifunctional or higher polyfunctional (meth) acrylates include trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, caprolactone-modified trimethylolpropane tri(meth)acrylate, pentaerythritol ethoxytetra(meth)acrylate, and caprolactam-modified dipentaerythritol hexa(meth)acrylate.

The total content of the bifunctional or higher functional polyfunctional (meth)acrylate is preferably 0.5% by mass or more and 30% by mass or less with respect to the total mass (100% by mass) of the radiation-curable color composition, more preferably 1% by mass or more and 25% by mass or less, and particularly preferably 2% by mass or more and 20% by mass or less. In addition, from the viewpoint of recording an image with superior stretchability, the total content of the bifunctional or higher functional polyfunctional (meth)acrylate is particularly preferably 20% by mass or less, even more preferably 15% by mass or less, and the polyfunctional (meth)acrylate is yet more preferably not contained. In this manner, it is possible to further increase the stretchability of the cured product of the radiation-curable color composition, and to also improve the weather resistance.

As the polymerizable compound, the radiation-curable color composition of the present embodiment may contain a monomer (vinyl ether group-containing (meth)acrylate) represented by General Formula (I).

$$CH_2=CR^1-COOR^2-O-CH=CH-R^3 \quad (I)$$

(In Formula (I), $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.)

The vinyl ether group-containing (meth)acrylate represented by General Formula (I) may be referred to simply as the "compound of Formula (I)".

The radiation-curable color composition according to the present embodiment containing the compound of Formula (I) makes it possible to make the curability of the radiation-curable color composition even more excellent. In addition, containing the compound of Formula (I) makes it possible to easily keep the viscosity of the composition low. Furthermore, rather than separately using a compound having a vinyl ether group and a compound having a (meth)acryl group, it is more preferable to use the compound of Formula (I) having both a vinyl ether group and a (meth)acryl group in one molecule, in terms of improving the curability of the radiation-curable color composition.

In General Formula (I), as the divalent organic residue having 2 to 20 carbon atoms represented by $R^2$, a linear, branched or cyclic alkylene group having 2 to 20 carbon atoms, which may be substituted, an alkylene group having 2 to 20 carbon atoms which has an oxygen atom through an ether bond and/or an ester bond in the structure and which may be substituted, and a divalent aromatic group having 6 to 11 carbon atoms, which may be substituted, are suitable. Among the above, alkylene groups having 2 to 6 carbon atoms such as an ethylene group, an n-propylene group, an isopropylene group, and a butylene group, and alkylene groups having 2 to 9 carbon atoms and having an oxygen atom through an ether bond in the structure such as an oxyethylene group, an oxy-n-propylene group, an oxyisopropylene group, and an oxybutylene group are suitably used. Further, from the viewpoint of being able to further lower the viscosity of the radiation-curable color composition and to further improve the curability, $R^2$ is more preferably a compound having a glycol ether chain forming an alkylene group having 2 to 9 carbon atoms having an oxygen atom through an ether bond in the structure such as an oxyethylene group, an oxy-n-propylene group, an oxy-isopropylene group, or an oxybutylene group.

In General Formula (I), as the monovalent organic residue having 1 to 11 carbon atoms represented by $R^3$, a linear, branched, or cyclic alkyl group having 1 to 10 carbon atoms, which may be substituted, or an aromatic group having 6 to 11 carbon atoms, which may be substituted, are preferable. Among the above, an alkyl group having 1 to 2 carbon atoms which is a methyl group or an ethyl group, and an aromatic group having 6 to 8 carbon atoms such as a phenyl group or a benzyl group are suitably used.

In a case where each of the above organic residues is a group which may be substituted, the substituents are divided into groups including a carbon atom and groups not including a carbon atom. First, in a case where the substituent is a group including a carbon atom, the carbon atom is counted in the carbon number of the organic residue. Examples of groups including a carbon atom include, but are not limited to, a carboxyl group and an alkoxy group. Next, examples of groups not including a carbon atom include, but are not limited to, a hydroxyl group and a halo group.

In a case of using the compound of Formula (I), the content is preferably 1% by mass or more and 50% by mass or less with respect to the total mass (100% by mass) of the radiation-curable color composition, more preferably 5% by mass or more and 40% by mass or less, even more preferably 10% by mass or more and 30% by mass or less, and particularly preferably 10% by mass or more and 25% by mass or less. When the content of the compound of Formula (I) is 1% by mass or more, it is possible to lower the viscosity of the composition and to further improve the curability of the composition. On the other hand, when the content is 50% by mass or less, it is possible to maintain the storage stability of the composition in an excellent state.

Specific examples of the compound of Formula (I) include, but are not limited to, 2-vinyloxyethyl(meth)acrylate, 3-vinyloxypropyl(meth)acrylate, 1-methyl-2-vinyloxyethyl(meth)acrylate, 2-vinyloxypropyl(meth)acrylate, 4-vinyloxybutyl(meth)acrylate, 1-methyl-3-vinyloxypropyl(meth)acrylate, 1-vinyloxymethyl propyl(meth)acrylate, 2-methyl-3-vinyloxypropyl(meth)acrylate, 1,1-dimethyl-2-vinyloxyethyl(meth)acrylate, 3-vinyloxybutyl(meth)acrylate, 1-methyl-2-vinyloxypropyl(meth)acrylate, 2-vinyloxybutyl(meth)acrylate, 4-vinyloxycyclohexyl(meth)acrylate, 6-vinyloxyhexyl(meth)acrylate, 4-vinyloxymethylcyclohexylmethyl(meth)acrylate, 3-vinyloxymethylcyclohexylmethyl(meth)acrylate, 2-vinyloxymethylcyclohexylmethyl(meth)acrylate, p-vinyloxymethylphenylmethyl(meth)acrylate, m-vinyloxymethylphenylmethyl(meth)acrylate, o-vinyloxymethylphenylmethyl(meth)acrylate, 2-(2-vinyloxyethoxy)ethyl methacrylate, 2-(2-vinyloxyethoxy)ethyl acrylic acid (VEEA), 2-(vinyloxyisopropoxy)ethyl(meth)acrylate, 2-(vinyloxyethoxy)propyl(meth)acrylate, 2-(vinyloxyethoxy)isopropyl(meth)acrylate, 2-(vinyloxyisopropoxy)propyl(meth)acrylate, 2-(vinyloxyisopropoxy)isopropyl(meth)acrylate, 2-(vinyloxyethoxyethoxy)ethyl(meth)acrylate, 2-(vinyloxyethoxyisopropoxy)ethyl(meth)acrylate, 2-(vinyloxyisopropoxyethoxy)ethyl(meth)acrylate, 2-(vinyloxyisopropoxyisopropoxy)ethyl(meth)acrylate, 2-(vinyloxyethoxyethoxy)propyl(meth)acrylate, 2-(vinyloxyethoxyisopropoxy)propyl(meth)acrylate, 2-(vinyloxyisopropoxyethoxy)propyl(meth)acrylate, 2-(vinyloxyisopropoxyisopropoxy)propyl(meth)acrylate, 2-(vinyloxyethoxyethoxy)isopropyl(meth)acrylate, 2-(vinyloxyethoxyisopropoxy)isopropyl(meth)acrylate, 2-(vinyloxyisopropoxyethoxy)isopropyl(meth)acrylate, 2-(vinyloxyisopropoxyisopropoxy)isopropyl(meth)acrylate, 2-(vinyloxyethoxyethoxyethoxy)ethyl(meth)acrylate, 2-(vinyloxyethoxyethoxyethoxyethoxy)ethyl(meth)acrylate, 2-(isopropenoxyethoxy)ethyl(meth)acrylate, 2-(isopropynoxyethoxyethoxy)ethyl(meth)acrylate, 2-(isopropynoxyethoxyethoxyethoxy)ethyl(meth)acrylate, 2-(isopropynoxyethoxyethoxyethoxy)ethyl(meth)acrylate, polyethylene glycol monovinyl ether (meth)acrylate, and polypropylene glycol monovinyl ether (meth)acrylate. Among these specific examples, VEEA: 2-(2-vinyloxyethoxy)ethyl acrylate is particularly preferable in terms of easy balance of curability and viscosity of the composition.

As a polymerizable compound, the radiation-curable color composition of the present embodiment may contain a monomer having a cyclic, linear, or branched structure which has one (meth)acryloyloxy group or (meth)acryloyl group, and in which the total number of the number of nitrogen atoms and the number of oxygen atoms other than oxygen atoms included in the (meth)acryloyloxy group and the (meth)acryloyl group is 2 or more.

Such a monomer is preferably a compound having a (meth)acryloyl group, and more preferably a compound having a (meth)acryloyl group directly bonded to a nitrogen atom. In addition, at least one of a nitrogen atom and an oxygen atom is preferably contained as an atom forming a ring. In addition, a compound having a cyclic skeleton is preferable. The cyclic skeleton more preferably has a heterocyclic structure. With such a compound, it is possible to more suitably reduce the odor of the radiation-curable color composition. In addition, containing such a monomer may suppress vaporization of other monomers of the radiation-curable color composition, and it may be possible to reduce the odor of the radiation-curable color composition.

Specific examples of monomers having a cyclic, linear, or branched structure which has one (meth)acryloyloxy group or (meth)acryloyl group, and in which the total number of the number of nitrogen atoms and the number of oxygen atoms other than oxygen atoms included in the (meth)acryloyloxy group and the (meth)acryloyl group is 2 or more include N-acryloyl morpholine (ACMO), N-methacryloyl morpholine, 1-acryloylpyrrolidin-2-one, 1-methacryloylpyrrolidin-2-one, 1-acryloylpiperidin-2-one, 1-methacryloylpiperidin-2-one, 2-hydroxy-3-phenoxypropyl(meth)acrylate, cyclic trimethylolpropane formal(meth)acrylate, (2-methyl-2-ethyl-1,3-dioxolan-4-yl) methyl(meth)acrylate, hydroxyethylacrylamide (HEAA), hydroxyethyl methacrylamide, dimethylaminopropyl acrylamide (DMAPAA), dimethylaminopropyl methacrylamide, and derivatives thereof.

"The total number of nitrogen atoms and oxygen atoms is 2 or more" encompasses a case of having two or more nitrogen atoms, a case of having two or more oxygen atoms, and a case of having two or more nitrogen atoms and oxygen atoms in total.

Among the examples described above, acrylamides are more preferable, and a compound having a cyclic skeleton is more preferable. Using such a compound tends to make it possible to more suitably reduce odor. In addition, in a case of having a cyclic skeleton, there is a tendency to be able to more preferably suppress increases in viscosity. From this viewpoint, N-acryloyl morpholine (ACMO), hydroxyethyl acrylamide (HEAA), dimethylaminopropyl acrylamide (DMAPAA) are preferable, and N-acryloyl morpholine (ACMO) is particularly preferable.

As a polymerizable compound, the radiation-curable color ink composition of the present embodiment may contain a monomer which is a monofunctional (meth)acrylate having an aromatic ring skeleton. Containing such a monomer may make it possible to make the solubility of the polymerization initiator included in the radiation-curable color composition according to the present embodiment better.

The monofunctional (meth)acrylate having an aromatic ring skeleton is a compound having an aromatic ring skeleton and having one (meth)acryloyl group as a polymerizable functional group in one molecule. Although not limited thereto, examples of the monofunctional (meth)acrylate having an aromatic ring skeleton include benzyl(meth)acrylate, phenoxyethyl(meth)acrylate (PEA), alkoxylated 2-phenoxyethyl(meth)acrylate, ethoxylated nonylphenyl(meth)acrylate, alkoxylated nonylphenyl(meth)acrylate, p-cumyl phenol EO-modified (meth)acrylate, and 2-hydroxy-3-phenoxypropyl(meth)acrylate. Examples of these commercially available products include Viscoat #192 (manufactured by Osaka Organic Chemical Industry Ltd., trade name, phenoxyethyl acrylate), SR340 (phenoxyethyl methacrylate), SR339A (phenoxyethyl acrylate), SR504 (ethoxylated nonylphenyl acrylate), CD614 (alkoxylated nonylphenyl acrylate), and CD9087 (alkoxylated 2-phenoxyethyl acrylate) (the above are all trade names manufactured by Sartomer Co., Ltd.).

Among the above, at least one of the compound represented by General Formula (II) and the compound represented by General Formula (III) is preferable.

$$CH_2=CR^4-COOR^5-Ar \quad (II)$$

$$CH_2=CR^4-COO-Ar \quad (III)$$

(In Formulas (II) and (III), $R^4$ is a hydrogen atom or a methyl group. In Formula (II), Ar representing the aromatic ring skeleton is a monovalent organic residue which has at least one aryl group in which the carbon atom forming the aryl group is bonded to the group represented by $R^5$, and $R^5$ is a divalent organic residue having 1 to 4 carbon atoms. In Formula (III), Ar representing the aromatic ring skeleton is a monovalent organic residue which has at least one aryl group in which the carbon atom forming the aryl group is bonded to —COO— in the formula.)

In General Formula (II), preferable examples of the group represented by $R^5$ include a linear, branched, or cyclic alkylene group having 1 to 4 carbon atoms, which may be substituted, or an alkylene group having an oxygen atom through an ether bond and/or an ester bond in the structure, having 1 to 4 carbon atoms, and which may be substituted. Among the above, alkylene groups having 1 to 4 carbon atoms such as an ethylene group, an n-propylene group, an isopropylene group, and a butylene group, and alkylene groups having an oxygen atom through an ether bond in the structure and having 1 to 4 carbon atoms such as an oxyethylene group, an oxy-n-propylene group, an oxyisopropylene group, and an oxybutylene group are suitably used. In a case where the organic residue is a group which may be substituted, the substituent is not particularly limited and examples thereof include a carboxyl group, an alkoxy group, a hydroxyl group, and a halo group, and in a case of a group where the substituent includes a carbon atom, the carbon atom is counted in the carbon number of the organic residue.

In General Formulas (II) and (III), examples of the aryl group of which at least one is included in Ar (aryl) (aromatic ring skeleton) include, but are not limited to, a phenyl group and a naphthyl group. The number of aryl groups is 1 or more, preferably 1 or 2. Among the carbon atoms forming the group, the aryl group may be substituted with a carbon atom bonded to an organic residue represented by $R^5$ in Formula (II), a carbon atom bonded to —COO— in Formula (III), a carbon atom bonding the aryl groups to each other in a case of having a plurality of aryl groups, or another carbon atom. In a case of being substituted, the number of substitutions per aryl group is 1 or more, preferably 1 or 2. The substituent is not particularly limited, and examples thereof include a linear, branched, or cyclic alkyl group and alkoxy group having 1 to 10 carbon atoms, a carboxyl group, a halo group, and a hydroxyl group.

When a monofunctional (meth)acrylate having an aromatic ring skeleton is contained, the solubility of the polymerization initiator described below tends to be good and the curability tends to be improved, which is preferable. In particular, in a case where an acylphosphine oxide-based polymerization initiator or a thioxanthone-based polymerization initiator is used, the solubility tends to be good. Among the monofunctional (meth)acrylates having an aromatic ring skeleton, phenoxyethyl(meth)acrylate and benzyl (meth)acrylate are preferable, but, since the compatibility with additives such as polymerization initiators is better, it is possible to further reduce the viscosity and odor, and it is possible to further improve reactivity (curability), phenoxyethyl(meth)acrylate is preferable, and phenoxyethyl acrylate (PEA) is particularly preferable.

The radiation-curable color composition of the present embodiment may contain a (meth)acrylate oligomer as a polymerizable compound. As the (meth)acrylate oligomer, it is possible to use one or more kinds selected from epoxy (meth)acrylate oligomers, urethane (meth)acrylate oligomers, and polyester (meth)acrylate oligomers.

The epoxy(meth)acrylate oligomer is not particularly limited and examples thereof include at least one kind selected from the group consisting of a compound having a bisphenol A skeleton and a compound having a polyester skeleton. Examples of commercially available products of such oligomers include, but are not limited to, bisphenol A skeleton-containing epoxy acrylate bifunctional oligomers such as CN 136, CN 104, CN 118, and CN 120; and polyester skeleton-containing epoxy acrylate bifunctional oligomers such as CN 2003 and CNUVE 151 (the above are all manufactured by Sartomer Co., Ltd.). Using such an epoxy (meth)acrylate oligomer, the tensile elongation and tensile strength of the coating film tend to be further improved.

Examples of urethane (meth)acrylate oligomers include, but are not limited to, aliphatic group and polyether skeleton-containing urethane acrylate oligomers such as CN 9893 and CN 996; alicyclic group-containing urethane acrylate oligomers such as CN 2920 and CN 9011; aromatic group and polyester skeleton-containing urethane acrylate oligomers such as CN 9782 and CN 9783; aliphatic group and polyester skeleton-containing urethane acrylate oligomers such as CN 964, CN 965, CN 981, and CN 982; and alicyclic group and polyester skeleton-containing urethane acrylate oligomers such as CN 991 (the above are all manufactured by Sartomer Co., Ltd.). Using such a urethane (meth)acrylate oligomer tends to further improve the tensile elongation and tensile strength of the coating film.

The polyester (meth)acrylate oligomer is not particularly limited and examples thereof include polyester (meth)acrylate oligomers such as CN 2254.

The radiation-curable color composition of the present embodiment may include a hydroxyl group-containing monomer as a polymerizable compound. Examples of hydroxyl group-containing monomers include monofunctional monomers and polyfunctional monomers containing a hydroxyl group among the polymerizable compounds described above. More specifically, among the polymerizable compounds having a hydroxyl group in the molecule, examples of more preferable hydroxyl group-containing monomers include hydroxyalkyl(meth)acrylate, hydroxy (meth)acrylate having an alicyclic structure, hydroxyl group-containing epoxy(meth)acrylate, and the like.

Examples of hydroxy(meth)acrylates include 2-hydroxyethyl(meth)acrylate, 2-hydroxypropyl(meth)acrylate, 2-hydroxy 3-phenoxypropyl(meth)acrylate, 4-hydroxybutyl (meth)acrylate, and the like.

Examples of hydroxy(meth)acrylates having an alicyclic structure include 1,4-cyclohexanedimethanol mono (meth) acrylate, and the like.

Examples of hydroxyl group-containing epoxy(meth) acrylates include an epoxy acrylate obtained by adding (meth)acrylic acid to a di- or poly-epoxy compound. It is possible to obtain an epoxy(meth)acrylate as a commercial product, and examples thereof include DA-111, DA-141, DA-212, DA-250, DA-314, DA-721, DA-722, DA-911M, DA-920, DA-931, DM-201, DM-811, DM-832, and DM-851 (the above are manufactured by Nagase ChemteX Corp.), and the like.

As the polymerizable compound, the radiation-curable color composition of the present embodiment may contain one kind or a plurality of kinds of the compounds exemplified above. Among the medium components in which solid content such as a polymerization initiator and a coloring material is dissolved or dispersed, the radiation-curable color composition according to the present embodiment is a nonaqueous composition which includes the most of the polymerizable compound described above, which is preferable from the viewpoint of curability, storage stability, and the like. Among the medium components included in the radiation-curable color composition, the medium component having the largest mass ratio is the polymerizable compound. The total content of the polymerizable compounds is preferably 40% by mass or more and 95% by mass or less with respect to the total mass (100% by mass) of the radiation-curable color composition, more preferably 50% by mass or more, even more preferably 60% by mass or more, and more preferably 90% by mass or less, and even more preferably 80% by mass or less. When the content of the polymerizable compound is within the above range, it is possible to further reduce the viscosity and odor, and to further improve the solubility and reactivity of the polymerization initiator.

1.1.3. Polymerization Initiator

The radiation-curable color composition of the present embodiment preferably contains a radiation polymerization initiator (also referred to below as a photopolymerization initiator or a polymerization initiator) which generates an active species by irradiation with radiation as a polymerization initiator. The polymerization initiator is not particularly limited, and examples thereof include known polymerization initiators such as alkylphenone-based polymerization initiators (IRGACURE 369 (2-benzyl-2-dimethylamino-1-(4-morpholinophenyl)-butanone-1), and the like), acylphosphine oxide-based polymerization initiators, titanocene-based polymerization initiators, and thioxanthone-based polymerization initiators. Among these, an acylphosphine oxide-based polymerization initiator is preferable. Containing the acylphosphine oxide-based polymerization initiator makes the curability of the composition excellent, and, in particular, the curability by a curing process using UV-LED tends to be superior.

Examples of acylphosphine oxide-based polymerization initiators include 2,4,6-trimethylbenzoyldiphenylphosphine oxide, bis(2,4,6-trimethylbenzoyl)-phenylphosphine oxide, bis-(2,6-dimethoxybenzoyl)-2,4,4-trimethylpentylphosphine oxide, and the like.

Commercially available products of acylphosphine oxide-based polymerization initiator include IRGACURE 819 (bis(2,4,6-trimethylbenzoyl)-phenylphosphine oxide), IRGACURE 1800 (a mixture with a mass ratio of 25:75 of bis-(2,6-dimethoxybenzoyl)-2,4,4-trimethylpentylphosphine oxide and 1-hydroxy-cyclohexyl-phenyl ketone), DAROCURE TPO (2,4,6-trimethylbenzoyl diphenylphosphine oxide) (the above are all manufactured by BASF Ltd.) and the like. Furthermore, among the above, IRGACURE 819 and DAROCURE TPO are particularly preferably used in combination. Since IRGACURE 819 has higher reactivity and DAROCURE TPO has good reactivity and higher solubility, combining both makes it possible to have better reactivity and solubility. Further, since IRGACURE 819 and/or DAROCURE TPO have sufficient sensitivity in the wavelength range of 380 nm to 430 nm, it is easy to make a design such that the absorbance is larger in that range than the absorbance by the ultraviolet absorber.

As the polymerization initiator, one kind of the compounds described above may be used singly, or two or more kinds thereof may be used in combination. The total content of the polymerization initiators described above is preferably 1% by mass or more and 20% by mass or less with respect to the total mass (100% by mass) of the radiation-curable color composition from the viewpoint of excellent curability and solubility, more preferably 3% by mass or more and 15% by mass or less, even more preferably 5% by mass or more and 10% by mass or less, and particularly preferably 7% by mass or more and 9% by mass or less.

1.1.4. Other Additives

The radiation-curable color composition according to the present embodiment may further include additives such as a dispersing agent, a polymerization inhibitor, a slipping agent, a photosensitizer, and a polymerization inhibitor, as necessary.

Dispersing Agent

In order to further improve the dispersibility of the pigment in the radiation-curable color composition as necessary, a dispersing agent may be further included. Although the dispersing agent is not particularly limited, examples thereof include dispersing agents commonly used for preparing a pigment dispersion such as a polymer dispersing agent. Specific examples thereof include dispersing agents having one or more kinds of polyoxyalkylene polyalkylene polyamines, vinyl polymers and copolymers, acrylic polymers and copolymers, polyesters, polyamides, polyimides, polyurethanes, amino polymers, silicon polymers, sulfur-containing polymers, fluorine-containing polymers, and epoxy resins, as a main component. It is possible to use commercially available products as the dispersing agent, and specific examples thereof include polyester-based polymer compounds such as Hinoact KF1-M, T-6000, T-7000, T-8000, T-8350P, and T-8000 EL (manufactured by Takefu Fine Chemicals Co., Ltd.), Solsperse 13940, 20000, 24000, 32000, 32500, 33500, 34000, 35200, and 36000 (manufactured by Lubrizol Corp.), Disperbyk-161, 162, 163, 164, 166, 180, 190, 191, and 192 (manufactured by BYK Additives & Instruments), Floren DOPA-17, 22, 33, G-700 (manufactured by Kyoeisha Chemical Co., Ltd.), Ajisper PB 821, PB 711 (manufactured by Ajinomoto Co., Ltd.), LP 4010, LP 4050, LP 4055, POLYMER 400, 401, 402, 403, 450, 451, and 453 (manufactured by EFKA Chemicals Co., Ltd.) singly, or mixtures thereof.

In a case where the dispersing agent is contained in the radiation-curable color composition, the content is preferably 5% by mass or more and 200% by mass or less with respect to the content of the coloring material (particularly the pigment) in the radiation-curable color composition, preferably 30% by mass or more and 120% by mass or less, and the content may be appropriately selected depending on the coloring material to be dispersed.

Polymerization Inhibitor

The radiation-curable color composition according to the present embodiment may further include a hindered amine compound or other substances as a polymerization inhibitor. Examples of other polymerization inhibitors include, but are not limited to, p-methoxyphenol, hydroquinone monomethyl ether (MEHQ), hydroquinone, cresol, t-butyl catechol, 3,5-di-t-butyl-4-hydroxytoluene, 2,2'-methylenebis(4-methyl-6-t-butylphenol), 2,2'-methylenebis(4-ethyl-6-butylphenol), and 4,4'-thiobis(3-methyl-6-t-butylphenol). One kind of polymerization inhibitor may be used singly, or two or more kinds thereof may be used in combination.

In a case where a polymerization inhibitor is contained, the total content is preferably 0.05% by mass or more and 0.5% by mass or less with respect to the total mass (100% by mass) of the radiation-curable color composition, and more preferably 0.1% by mass or more and 0.5% by mass or less.

Slipping Agent

The radiation-curable color composition according to the present embodiment may further include a slipping agent. The slipping agent is preferably a silicone surfactant, and more preferably a polyester-modified silicone or a polyether-modified silicone. Examples of polyester-modified silicones include BYK-347, 348, BYK-UV 3500, 3510, and 3530 (the above are manufactured by BYK Additives & Instruments), and examples of polyether-modified silicones include BYK-3570 (manufactured by BYK Additives & Instruments) and the like. The slipping agents may be used singly or in a combination of two or more kinds thereof.

In a case where the slipping agent is contained, the total content is preferably 0.01% by mass or more and 2% by mass with respect to the total mass (100% by mass) of the radiation-curable color composition, and more preferably 0.05% by mass or more and 1% by mass or less.

Photosensitizer

The radiation-curable color composition according to the present embodiment may further include a photosensitizer. Examples of photosensitizers include amine compounds (aliphatic amines, an amine containing an aromatic group, piperidine, a reaction product of an epoxy resin and amine, triethanolamine triacrylate, and the like), urea compounds (allyl thiourea, o-tolylthiourea, and the like), sulfur compounds (sodium diethyl dithiophosphate, soluble salt of aromatic sulfinic acid, and the like), nitrile-based compounds (N,N-diethyl-p-aminobenzonitrile), phosphorus compounds (tri-n-butylphosphine, sodium diethyl dithiophosphide, and the like), nitrogen compounds (Michler's ketone, N-nitroso hydroxylamine derivatives, oxazolidine compounds, tetrahydro-1,3-oxazine compounds, a condensate of formaldehyde or acetaldehyde and diamine, and the like), chlorine compounds (carbon tetrachloride, hexachloroethane, and the like), and the like.

1.1.5. Physical Properties

The viscosity of the radiation-curable color composition according to the present embodiment at 20° C. is preferably 25 mPa·s or less, and more preferably 5 to 20 mPa·s. When the viscosity of the radiation-curable color composition at 20° C. is in the above range, an appropriate amount of the radiation-curable color composition is discharged from the nozzle and it is possible to further reduce flying deflection and scattering, thus, suitable use in an ink jet recording apparatus is possible. It is possible to carry out the measurement of the viscosity by raising the Shear Rate to 10 to 1000 in an environment of 20° C. using a viscoelasticity tester MCR-300 (manufactured by Pysica) and reading the viscosity at Shear Rate 200 hours.

The surface tension of the radiation-curable color composition according to the present embodiment at 20° C. is preferably 20 mN/m or more and 30 mN/m or less. When the surface tension of the radiation-curable color composition at 20° C. is within the above range, the radiation-curable color composition does not easily wet a nozzle subjected to a liquid repellent treatment. Due to this, an appropriate amount of the ink is discharged from the nozzles, and it is possible to further reduce flying deflection and scattering, thus suitable use in an ink jet recording apparatus is possible. It is possible to carry out the measurement of the surface tension by confirming the surface tension when the platinum plate was wetted with the composition in an environment of 20° C. using an automatic surface tensiometer CBVP-Z (manufactured by Kyowa Interface Science Co., Ltd.).

1.1.6. Method for Producing Radiation-Curable Color Composition

It is possible to carry out the manufacturing (preparation) of the radiation-curable color composition by mixing each component contained in the radiation-curable color composition and stirring the components so as to mix the components sufficiently uniformly. In the present embodiment, the preparation of the radiation-curable color composition preferably has a step of carrying out at least one of an ultrasonic treatment and a heating treatment with respect to the mixture in which the polymerization initiator and at least a part of the polymerizable compound are mixed in the preparation step. Due to this, it is possible to reduce the amount of dissolved oxygen in the radiation-curable color composition after preparation and it is possible to obtain excellent discharge stability and storage stability. The mixture described above may include at least the components described above, may further include other components included in the radiation-curable color composition, or may include all the components included in the radiation-curable color ink. The polymerizable compound included in the mixture may be at least a part of the polymerizable compound included in the radiation-curable color composition.

1.2. Radiation-Curable Clear Composition

The radiation-curable clear composition of the ink jet composition set according to the present embodiment contains an ultraviolet absorber, a polymerizable compound, and a polymerization initiator. Here, the clear composition does not include a coloring material or contains a coloring material in an amount which does not cause coloring (for example, 0.1% by mass or less, preferably 0.05% by mass or less, more preferably 0.01% by mass or less).

1.2.1. Ultraviolet Absorber

The radiation-curable clear composition contains an ultraviolet absorber. Examples of ultraviolet absorbers include hydroxyphenyl benzotriazole, hydroxyphenyl triazine, hydroxybenzophenone, oxalic anilide, and hindered amine compounds.

Examples of hydroxybenzotriazole include 2-(2'-hydroxyphenyl) benzotriazole and derivatives thereof such as 2-(2'-hydroxy-5'-methylphenyl)-benzotriazole, 2-(2'-hydroxy-4'-octyloxyphenyl)benzotriazole, 2-(2'-hydroxy-5'-(1,1,3,3-tetramethylbutyl)phenyl)benzotriazole, 2-[2'-hydroxy-3'-(α,α-dimethylbenzyl)-5'-(1,1,3,3-tetramethylbutyl)-phenyl]benzotriazole, 2-[2'-hydroxy-3'-(1,1,3,3-tetramethylbutyl)-5'-(α,α-dimethylbenzyl)-phenyl]benzotriazole, 2-(2-hydroxy-5-t-butylphenyl)-2H-benzotriazole, 2,2'-methylene-bis[4-(1,1,3,3-tetramethylbutyl)-6-benzotriazol-2-ylphenol], 2-(2H-benzotriazol-2-yl)-4,6-bis(1-methyl-1-phenylethyl)phenol, 2-(2H-benzotriazol-2-yl)-6-(1-methyl-1-phenylethyl)-4-(1,1,3,3-tetramethylbutyl)phenol, 2-(3,5-di-t-amyl-2-hydroxyphenyl)benzotriazole, 2-(3,5-di-t-butyl-2-hydroxyphenyl)benzotriazole, 2-(3',5'-di-t-butyl-2'-hydroxyphenyl)benzotriazole, 2-(3',5'-di-t-amyl-2'-hydroxyphenyl)

benzotriazole, 2-(3',5'-di-t-butyl-2'-hydroxyphenyl)-5-chloro-benzotriazole, 2-(3',5'-bis-(α,α-dimethylbenzyl)-2'-hydroxyphenyl)benzotriazole, 2-(3'-sec-butyl-5'-t-butyl-2'-hydroxyphenyl)benzotriazole, 2-(3'-t-butyl-2'-hydroxy-5'-methylphenyl)-5-chloro-benzotriazole, 2-(3'-t-butyl-2'-hydroxy-5'-(2-octyloxycarbonylethyl)phenyl)-5-chloro-benzotriazole, 2-(3'-t-butyl-2'-hydroxy-5'-(2-methoxycarbonylethyl)phenyl)benzotriazole, 2-(3'-t-butyl-2'-hydroxy-5'-(2-methoxycarbonylethyl)phenyl)-5-chloro-benzotriazole, 2-(3'-t-butyl-2'-hydroxy-5'-(2-octyloxycarbonylethyl)phenyl)benzotriazole, 2-(3'-t-butyl-5'-[2-(2-ethylhexyloxy)-carbonylethyl]-2'-hydroxyphenyl)benzotriazole, 2-(3'-t-butyl-5'-[2-(2-ethylhexyloxy)-carbonylethyl]-2'-hydroxyphenyl)-5-chloro-benzotriazole, 2-(3'-t-butyl-2'-hydroxy-5'-(2-isooctyloxycarbonylethyl) phenylbenzotriazole, 2-[3'-t-butyl-5'-(2-methoxycarbonylethyl)-2'-hydroxyphenyl]-2H-benzotriazole, 2-(3'-dodecyl-2'-hydroxy-5'-methylphenyl)benzotriazole, 2-(5-methyl-2-hydroxyphenyl)benzotriazole, and 2-(5'-t-butyl-2'-hydroxyphenyl)benzotriazole.

Commercial products of hydroxyphenyl benzotriazole include Tinuvin P, PS, 99-2, 109, 123, 326, 171, 234, 328, 384-2, 900, 928, and 1130 (trade names, manufactured by Ciba Japan), Lowilite 26, 27, 28, 29, 35, and 234 (manufactured by Great Lakes Chemical Corp.), Kemisorb 12, 71, 72, 73, 74, 75, and 79 (trade names, Chemipro Kasei Kaisha, Ltd.), Seesorb 701, 703, 704, 705, 706, and 709 (trade names, Shipro Kasei Kaisha Ltd.), RUVA 93 (trade name, Otsuka Chemical Co., Ltd.), and the like.

Examples of hydroxyphenyl triazine include 2-(2-hydroxyphenyl)-1,3,5-triazine and derivatives thereof such as 2-(2-hydroxy-4-(2-ethyl-hexyl)oxy)phenyl-4,6-di(4-phenyl)phenyl-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2-(2-hydroxy-4-[1-octyloxycarbonylethoxy]phenyl)-4,6-bis(4-phenylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-[2-hydroxy-4-(2-hydroxy-3-octyloxypropyloxy) phenyl]-4,6-bis(2,4-dimethyl)-1,3,5-triazine, 2-[2-hydroxy-4-(2-hydroxy-3-butyloxypropoxy)phenyl]-4,6-bis(2,4-dimethyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-{2-hydroxy-4-[3-(2-ethylhexyl-1-oxy)-2-hydroxy-propyloxy]phenyl}-4,6-bis(2,4-dimethylphenyl)-1,3,5-triazine, 2-(2,4-dihydroxyphenyl)-4,6-bis(2,4-dimethylphenyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2-[4-[(2-hydroxy-3-(2'-ethyl)hexyl)oxy]-2-hydroxyphenyl]-4,6-bis(2,4-dimethylphenyl)-1,3,5-triazine, 2-(2-hydroxyphenyl)-4-(4-methoxyphenyl)-6-phenyl-1,3,5-triazine, 2,4-bis[2-hydroxy-4-butoxyphenyl]-6-(2,4-dibutoxyphenyl)-1,3,5-triazine, 2,4,6-tris(2-hydroxy-4-(3-butoxy-2-hydroxypropoxy)phenyl]-1,3,5-triazine, 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, and 2,4-bis(2-hydroxy-4-propyloxyphenyl)-6-(2,4-dimethylphenyl)-1,3,5-triazine.

It is possible to use these hydroxyphenyl triazines singly or in a combination of two or more kinds thereof. Examples of commercially available products include Tinuvin 400, 405, 460, 477-DW, 479 (trade names, manufactured by Ciba Japan), and Kemisorb 102L (trade name, manufactured by Chemipro Kasei Kaisha, Ltd.), and the like.

Examples of hydroxybenzophenones include benzophenones including 2-hydroxy, 4-hydroxy, 4-methoxy, 4-octyloxy, 4-decyloxy, 4-dodecyloxy, 4-benzyloxy, and 2'-hydroxy-4,4'-dimethoxy derivatives.

Oxalic anilide is also called oxanilide. Examples of oxalic anilides include 4,4'-dioctyloxyoxanilide, 2,2'-diethoxyoxanilide, 2,2'-dioctyloxy-5,5'-di-t-butoxanilide, 2,2'-didodecyloxy-5,5'-di-t-butoxanilide, 2-ethoxy-2'-ethyloxanilide, N,N'-bis(3-dimethylaminopropyl) oxamide, 2-ethoxy-5-t-butyl-2'-ethoxanilide, a mixture of 2-ethoxy-2'-ethyl-5,4'-di-t-butoxanilide, a mixture of o- and p-methoxy-2-substituted oxanilides, and a mixture of o- and p-ethoxy-2-substituted oxanilides.

Examples of hindered amine compounds include 1,2,2,6,6-pentamethyl-4-piperidinylmethacrylate, bis(1,2,2,6,6-pentamethyl-4-piperidyl)sebacate, bis(2,2,6,6-pentamethyl-4-piperidyl)sebacate, bis(1,2,2,6,6-pentamethyl-4-piperidinyl)sebacate, methyl(1,2,2,6,6-pentamethyl-4-piperidinyl)sebacate, 2,4-bis[N-butyl-N-(1-cyclohexyloxy-2,2,6,6-tetramethylpiperidin-4-yl)amino]-6-(2-hydroxyethylamine)-1,3,5-triazine), and the like. Commercially available products include Tinuvin 123 (trade name, manufactured by Ciba Japan), and the like.

One kind of ultraviolet absorber may be used singly, or two or more kinds thereof may be used in combination. The content of the ultraviolet absorber is 0.1% by mass or more and 10% by mass or less in total with respect to the total mass of the radiation-curable clear composition, more preferably 1% by mass or more and 8% by mass or less, and even more preferably 2% by mass or more and 5% by mass or less. When the content of the ultraviolet absorber is within the above range, the curability of the radiation-curable clear composition is excellent and the light fastness of the image recorded by the radiation-curable color composition is also excellent. In addition, in this manner, in a case where a radiation-curable clear composition is used together with the radiation-curable color composition, color fading of the coloring material may be further suppressed by the ultraviolet ray shielding effect by the ultraviolet absorber.

In addition, the radiation-curable clear composition includes hydroxyphenyl benzotriazole and hydroxyphenyl triazine as an ultraviolet absorber, in which, in the ratio of the content of hydroxyphenyl benzotriazole and hydroxyphenyl triazine in mass ratio, the hydroxyphenyl triazine is preferably 2 or more and 4 or less with respect to 1 hydroxyphenyl benzotriazole.

In this manner, it is easy to balance the absorption of ultraviolet rays in the relatively long wavelength region (close to 380 nm) by hydroxyphenyl benzotriazole and the absorption of ultraviolet rays in the relatively short wavelength region (close to 310 nm) by hydroxyphenyl triazine, in a case where the radiation-curable clear ink is used together with the radiation-curable color composition, the color fading of the coloring material (in particular, C.I. Pigment Orange 43) in the radiation-curable color composition is further suppressed by the ultraviolet ray shielding effect by the ultraviolet absorber.

In addition, in this manner, the amount of absorption of ultraviolet rays in a relatively long wavelength region (close to 380 nm) and the amount of absorption of ultraviolet rays in a relatively short wavelength region (close to 310 nm) are suitably adjusted, and, in particular, it is possible to suitably suppress the amount of absorption close to 380 to 430 nm, thus, it is difficult to inhibit the ultraviolet absorption of the polymerization initiator close to 380 to 430 nm and, as a result, the reaction of the initiator proceeds well and it is possible to make the curability of the composition good.

1.2.2. Polymerizable Compound

The radiation-curable clear composition contains a polymerizable compound. The polymerizable compound is the same as described for the radiation-curable color composition described above. The polymerizable compound included in the radiation-curable clear composition may be partially or entirely the same as the polymerizable compound included in the radiation-curable color composition or may be partially or entirely different.

In addition, from the viewpoint that it is possible to reduce the blending amount of the polymerization initiator, that is possible to further reduce the coloring, and that it is possible to obtain a superior coating film hardness, the radiation-curable clear composition preferably includes a hydroxyl group-containing monofunctional (meth)acrylate, which is a monomer containing a hydroxyl group, as the polymerizable compound from among the polymerizable compounds described above.

1.2.3. Polymerization Initiator

The radiation-curable clear composition contains a polymerization initiator. The polymerization initiator is the same as described for the radiation-curable color composition described above. The polymerization initiator included in the radiation-curable clear composition may be partially or entirely the same as the polymerization initiator included in the radiation-curable color composition or may be partially or entirely different.

In addition, in the radiation-curable clear composition, the content of the polymerization initiator is preferably 1% by mass or more and 10% by mass or less, more preferably 3% by mass or more and 8% by mass or less, and even more preferably 5% by mass or more and 6% by mass or less. In addition, when the content is 6% by mass or less, it is possible to effectively suppress the coloring of the radiation-curable clear composition.

1.2.4. Other Additives, Physical Properties, and Manufacturing Methods

Other additives which are able to be included in the radiation-curable clear composition and the physical properties of the radiation-curable clear composition are the same as those of the radiation-curable color composition, thus, a detailed explanation thereof is omitted. In addition, the method for producing the radiation-curable clear composition is the same as the radiation-curable color composition except that a coloring material is not contained therein, thus, a detailed description thereof is omitted.

2. Ink Jet Composition Set

The ink jet composition set of the present embodiment includes a radiation-curable color composition including a perinone-based pigment as a coloring material among the radiation-curable color composition described above, and the radiation-curable clear composition described above. In other words, the ink jet composition set of the present embodiment includes a radiation-curable color composition, which contains a perinone-based pigment, a polymerizable compound, and a polymerization initiator, and a radiation-curable clear composition which contains an ultraviolet absorber, a polymerizable compound, and a polymerization initiator. Here, the polymerizable compound included in the radiation-curable color composition, the polymerizable compound included in the radiation-curable clear composition, the polymerization initiator included in the radiation-curable color composition, and the polymerization initiator included in the radiation-curable clear composition are each independently selected from the polymerizable compounds and the polymerization initiators described above and all or parts thereof may or may not be used in common. In addition, the ultraviolet absorber included in the radiation-curable clear composition here is selected from the ultraviolet absorbers described above.

The ink jet composition set of the present embodiment is suitable for use for recording by an ink jet method. The radiation-curable color composition and the radiation-curable clear composition are compositions used by being ejected from an ink jet head by an ink jet method. In addition, as an embodiment of a "radiation-curable type" composition, description may be given of an "ultraviolet curing type", a "light curing type", or the like, but, in the present embodiment, a radiation-curable type composition used by curing by being irradiated with radiation is sufficient, and ultraviolet curing type or light curing type may be read as radiation-curable type. Examples of the radiation include ultraviolet rays, infrared rays, visible rays, X-rays, and the like. As the radiation, ultraviolet rays are preferable, in the point that radiation sources are easily available and widely used and the point that materials suitable for curing by ultraviolet radiation are easily available and widely used.

The perinone-based pigment is not particularly limited as long as the perinone-based pigment has a perinone structure, but examples thereof include C.I. Pigment Orange 43 (POr 43), C.I. Pigment Red 194 (PR 194), and the like. Use of the above is preferable in that it is possible to widen the gamut. Among the above, as the perinone-based pigment to be contained in the radiation-curable color composition of the present embodiment, the C.I. Pigment Orange 43 (POr 43) is more preferable from the viewpoint of widening the gamut.

Here, C.I. Pigment Orange 43 (POr 43) is a kind of pigment, the molecular formula is $C_{26}H_{12}N_4O_2$, the chemical name is "bisbenzimidazo [2,1-b: 2',1'-i] benzo [lmn] [3,8] phenanthroline-8,17-dione" or "1,8-(1H-benzimidazole-2,1-diylcarbonyl)-5,4-(1H-benzimidazole-2,1-diylcarbonyl) naphthalene". In addition, in the Chemical Abstract Service, (CAS)POr 43 is registered as CAS number "4424-06-0". POr 43 is another name, C.I. Vat Red 7, Indanthrene Brilliant Orange, C.I. Vat Orange 7, and the like. In addition, the color index number is 71105.

The average particle size of POr 43 is preferably 300 nm or less, and more preferably 50 nm or more and 200 nm or less. When the average particle size is in the above range, the reliability of the ink such as the ejection stability and dispersion stability is further improved and it is possible to form an image with excellent image quality. Here, the average particle size in this specification is measured by the dynamic light scattering method.

POr 43 is relatively light-resistant in comparison with other pigments of similar colors. However, it is understood that perinone-based pigments such as POr 43 are still inferior in light fastness in comparison with coloring materials of other colors such as cyan, magenta, and yellow, for example. In the ink jet composition set of the present embodiment, the ultraviolet absorber being contained in the radiation-curable clear composition and/or radiation-curable color composition absorbs (shields) ultraviolet rays in a wavelength region which has an influence on the color development of perinone-based pigments such as POr 43, thus compensating for the light fastness of perinone-based pigments such as POr 43.

Among perinone-based pigments, it is possible to use commercially available POr 43, for example. Without being limited thereto, for example, POr 43 is available from Tokyo Chemical Industry Co., Ltd. The content of POr 43 in the radiation-curable color composition is not particularly limited, but is 0.5% by mass or more and 8% by mass or less, preferably 1% by mass or more and 7% by mass or less, more preferably 2% by mass or more and 6% by mass or less, and even more preferably 3% by mass or more and 5% by mass or less. As will be described below, the radiation-curable color composition may contain a coloring material other than a perinone-based pigment, and the content of the perinone-based pigment in that case is not particularly limited but is 0.1% by mass or more and 5% by mass or less, preferably 0.5% by mass or more and 4% by mass or less, and more preferably 1% by mass or more and 4% by mass or less.

In addition, the radiation-curable color composition according to the present embodiment may contain a coloring material other than a perinone-based pigment, as necessary, in a range in which a predetermined hue is obtained. Examples of coloring materials other than a perinone-based pigment include C.I. Pigment Orange 36, C.I. Pigment Orange 64, and the like. In a case where a coloring material other than a perinone-based pigment is contained in the radiation-curable color composition, the total content thereof is, for example, 0.1% by mass or more and 5% by mass or less, preferably 0.5% by mass or more and 4% by mass or less, and more preferably 1% by mass or more and 4% by mass or less.

According to the ink jet composition set of the present embodiment, it is possible to sufficiently cure the radiation-curable color composition and the radiation-curable clear composition. In addition, in a case where a radiation-curable clear composition is used together with the radiation-curable color composition, color fading of the perinone-based pigment is suppressed by the ultraviolet ray shielding effect by the ultraviolet absorber included in the radiation-curable clear composition. Due to this, it is possible to obtain recorded matter containing a perinone-based pigment such as POr 43 having a good light fastness and color developing property.

In the ink jet composition set of the present embodiment, it is possible to select the ultraviolet absorber and the polymerization initiator such that the absorbance of the ultraviolet absorber included in the radiation-curable clear composition at a wavelength of 380 nm or more and 430 nm or less at the concentration included in the radiation-curable clear composition is smaller than the absorbance of the polymerization initiator included in the radiation-curable clear composition. Examples of combinations of the ultraviolet absorber and the polymerization initiator include one or more kinds of ultraviolet absorbers selected from Tinuvin 400, 405, 109 and 384-2, and one or more kinds of polymerization initiators selected from IRGACURE 819 and DAROCURE TPO and 369.

In this manner, in the radiation-curable clear composition, since it is possible to reduce absorption by the ultraviolet absorber in the wavelength range of ultraviolet rays for activating the polymerization initiator, it is possible to more sufficiently cure the radiation-curable clear composition, and, in a case where a radiation-curable clear composition is used together with the radiation-curable color composition, the ultraviolet ray shielding effect by the ultraviolet absorber included in the radiation-curable clear composition makes it possible to suppress the color fading of perinone-based pigments such as POr 43 included in the radiation-curable color composition.

It is possible to perform measurement of the absorbance of the ultraviolet absorber and the polymerization initiator at a wavelength of 380 nm or more and 430 nm or less, for example, as follows. With an ink (composition) whose composition and concentration are already known, the same amount of ultraviolet absorber or polymerization initiator as contained in the ink is dissolved in an absorbance-measuring solvent (phenoxyethyl acrylate or the like), respectively, the absorbance spectrum including the range of 380 nm or more and 430 nm or less is measured using a spectrophotometer, and it is possible to determine the respective absorbance from the area in a range of 380 nm or more and 430 nm or less of the absorbance spectrum and to compare the magnitude relationship of the absorbances. On the other hand, with an ink (composition) whose composition or concentration is unknown, composition (qualitative/quantitative) analysis of the ink is determined by various kinds of analyzers such as a chromatograph, and the absorbance is obtained in the same manner as above to make it possible to compare the magnitude relationship of the absorbances.

In the ink jet composition set of the present embodiment, the ultraviolet absorber included in the radiation-curable clear composition may be one or more kinds selected from hydroxyphenyl benzotriazole, hydroxyphenyl triazine, hydroxybenzophenone, and oxalic anilide among the ultraviolet absorbers described above. When the ultraviolet absorber included in the radiation-curable clear composition is selected in this manner, absorption by the ultraviolet absorber is easily reduced in the wavelength range of ultraviolet rays for activating the polymerization initiator included in the radiation-curable clear composition. Therefore, it is possible to more sufficiently cure the radiation-curable clear composition and, in a case where the radiation-curable clear composition is used together with the radiation-curable color composition, the ultraviolet ray shielding effect by the ultraviolet absorber included in the radiation-curable clear composition makes it possible to further suppress the color fading of the perinone-based pigment such as POr 43 included in the radiation-curable clear composition.

In the ink jet composition set of the present embodiment, the ultraviolet absorber included in the radiation-curable clear composition preferably includes hydroxyphenyl benzotriazole and hydroxyphenyl triazine, and the ratio of the contents of hydroxyphenyl benzotriazole and hydroxyphenyl triazine in mass ratio is preferably 2 or more and 4 or less of hydroxyphenyl triazine with respect to 1 hydroxyphenyl benzotriazole.

In this manner, it is easy to balance the absorption of ultraviolet rays in the relatively long wavelength region (close to 380 nm) by hydroxyphenyl benzotriazole and the absorption of ultraviolet rays in the relatively short wavelength region (close to 310 nm) by hydroxyphenyl triazine, and in a case where a radiation-curable clear composition is used together with the radiation-curable color composition, due to the ultraviolet ray shielding effect by the ultraviolet absorber, it is possible to further suppress the color fading of perinone-based pigments (in particular, C.I. Pigment Orange 43) in the radiation-curable color composition.

In addition, the amount of absorption of ultraviolet rays in a relatively long wavelength region (close to 380 nm) and the amount of absorption of ultraviolet rays in a relatively short wavelength region (close to 310 nm) are suitably adjusted, and, in particular, it is possible to suitably suppress the amount of absorption close to 380 to 430 nm, thus, it is difficult to inhibit the ultraviolet absorption of the polymerization initiator close to 380 to 430 nm and, as a result, the reaction of the initiator proceeds well and it is possible to make the curability of the composition good.

In the ink jet composition set of the present embodiment, the content of the polymerization initiator in the radiation-curable color composition may be greater than the content of the polymerization initiator in the radiation-curable clear composition. According to such an ink jet composition set, it is possible to additionally promote the curing of the radiation-curable color composition when curing the radiation-curable clear composition.

The ink jet composition set of the present embodiment may further include a radiation-curable color composition 2, which contains at least one or more kinds selected from C.I. Pigment Yellow 155, C.I. Pigment Yellow 74, and C.I. Pigment Yellow 150, a polymerizable compound C and a polymerization initiator C, a radiation-curable color composition 3, which contains C.I. Pigment Red 122, a polymerizable compound D, and a polymerization initiator D, and a radiation-curable color composition 4, which contains C.I. Pigment Blue 15:3, a polymerizable compound E, and a polymerization initiator E.

That is, in a case where the radiation-curable color composition of an ink jet composition set including a radiation-curable color composition, which contains the perinone-based pigment described above, the polymerizable compound, and the polymerization initiator, and a radiation-curable clear composition, which contains an ultraviolet absorber, a polymerizable compound, and a polymerization initiator, is referred to as the radiation-curable color composition 1 and the polymerizable compound and the polymerization initiator included therein are referred to respectively as polymerizable compound A and polymerization initiator A, the ink jet composition set of the present embodiment may further include the radiation-curable color composition 2, which contains at least one or more kinds selected from C.I. Pigment Yellow 155, C.I. Pigment Yellow 74, and C.I. Pigment Yellow 150, a polymerizable compound C and a polymerization initiator C, the radiation-curable color composition 3, which contains C.I. Pigment Red 122, a polymerizable compound D, and a polymerization initiator D, and the radiation-curable color composition 4, which contains C.I. Pigment Blue 15:3, a polymerizable compound E, and a polymerization initiator E.

Here, it is possible to select the radiation-curable color composition 2, the radiation-curable color composition 3, and the radiation-curable color composition 4 with the same components and blending amounts as the radiation-curable color composition 1 described above except for a different kind of coloring material. The numbers 1, 2, and the like attached to each composition and the symbols A, B, and the like attached to the polymerizable compound and the polymerization initiator are attached for the purpose of distinction for the illustration and there is no intention to attach significance such as order, number, or importance thereto. The same applies below.

According to such an ink jet composition set, since the light fastness of the radiation-curable color composition 1 and the light fastness of the radiation-curable color composition 2, the radiation-curable color composition 3, and the radiation-curable color composition 4 are balanced, it is possible to make it difficult to cause a change in hue in the recorded image.

3. Modified Embodiment of Ink Jet Composition Set

In the ink jet composition set of the present embodiment described above, the radiation-curable color composition 1 may contain the ultraviolet absorber A. According to such an ink jet composition set, since the radiation-curable color composition 1 itself includes the ultraviolet absorber A, the color fading of the perinone-based pigment is further suppressed by the ultraviolet ray shielding effect by the ultraviolet absorber A. Even in a case where the ink jet composition set according to the present embodiment further includes the radiation-curable color composition 2, the radiation-curable color composition 3, and the radiation-curable color composition 4, one or more of the radiation-curable color composition 2, the radiation-curable color composition 3, and the radiation-curable color composition 4 may respectively include the ultraviolet absorber C, the ultraviolet absorber D, and the ultraviolet absorber E, in which case it is possible to obtain the same effects.

For the selection of the ultraviolet absorber A, the ultraviolet absorber C, the ultraviolet absorber D, and the ultraviolet absorber E, each is able to be independently appropriately selected and blended from the same viewpoint as the ultraviolet absorber contained in the radiation-curable clear composition according to the selection of the polymerization initiator A, the polymerization initiator C, the polymerization initiator D, and the polymerization initiator E.

4. Ink Jet Recording Method

The ink jet recording method of the present embodiment includes attaching a radiation-curable clear composition to the attachment region of a radiation-curable color composition after attaching the radiation-curable color composition. In addition, the ink jet recording method according to the present embodiment may include a step of attaching the radiation-curable color composition to a recording medium and a step of irradiating the radiation-curable color composition on the recording medium with the light of an ultraviolet ray-emitting diode (UV-LED), and attaching a radiation-curable clear composition to the attachment region of the radiation-curable color composition. In this manner, a cured film is formed on the portion where the composition is attached on the recording medium.

Radiation-Curable Color Composition Attaching Step

In the step of attaching the radiation-curable color composition on the recording medium, it is possible to use a known ink jet recording apparatus. When discharging the radiation-curable color composition, the viscosity of the radiation-curable color composition at 20° C. as described above is preferably 25 mPa·s or less, and more preferably 5 to 20 mPa·s. If the viscosity of the radiation-curable color composition is within the above range, it is possible to discharge the radiation-curable color composition after setting the temperature of the radiation-curable color composition to room temperature, or without heating. On the other hand, the radiation-curable color composition may be discharged at a preferable viscosity by being heated to a predetermined temperature. In this manner, good discharge stability is realized.

Since the radiation-curable color composition has a higher viscosity than water-based ink compositions generally used for ink jet applications, changes in viscosity due to changes in the temperature during discharge are large. The viscosity changes of such a radiation-curable color composition have a great influence with respect to changes in the droplet size and changes in the liquid droplet ejection speed, which may cause a deterioration in the image quality. Accordingly, it is preferable to keep the temperature of the radiation-curable color composition at the time of discharge as constant as possible.

Examples of the recording medium include are not particularly limited and include plastics such as polyvinyl chloride, polyethylene terephthalate, polypropylene, polyethylene, and polycarbonate, recording media with processed surfaces, glass, coated paper, and the like. In addition, in a case where three-dimensional modeling is performed using the ink jet composition set of the present embodiment, the recording medium may be a cured product of each composition.

Curing Step (Light Irradiation Step)

Next, in the curing step, the radiation-curable color composition attached on the recording medium is cured by UV-LED light irradiation. In other words, the coating film of the radiation-curable color composition formed on the recording medium is irradiated with UV-LED light to become a cured film. This is because the polymerization initiator which is able to be included in the radiation-curable color composition decomposes upon irradiation with ultraviolet rays to generate active species (initiating species) such as radicals, acids, and bases, and the polymerization reaction of the polymerizable compound is promoted by the function of the initiating species. Alternatively, this is because polymerization reaction of the polymerizable compound starts by irradiation with ultraviolet rays. At this time, when a sensitizing dye is present together with the polymerization initiator in the radiation-curable color composition, the sensitizing dye in the system absorbs active radiation, enters an excited state, and comes into contact with the polymerization initiator, which promotes decomposition of the polymerization initiator and makes it possible to achieve a higher sensitivity curing reaction.

In addition, using UV-LED as the ultraviolet ray source makes it possible to reduce the size of the apparatus and reduce costs. Since the UV-LED as the ultraviolet ray source is compact, mounting on the ink jet recording apparatus is possible. For example, attachment is possible to a carriage (both ends along the medium width direction and/or the medium transporting direction side) on which a recording head for discharging the radiation-curable color composition is mounted. Furthermore, the composition of the radiation-curable color composition described above makes it possible to realize curing with low energy and high speed. The irradiation energy is calculated by multiplying the irradiation time by the irradiation intensity. Therefore, it is possible to shorten the irradiation time and increase the printing speed. On the other hand, it is also possible to reduce the irradiation intensity. Due to this, since it is possible to reduce the temperature increases in the printed matter, the odor of the cured film is also reduced.

From the viewpoint of reducing the odor of the cured film, the irradiation energy is preferably 50 to 1000 mJ/cm$^2$, more preferably 100 to 700 mJ/cm$^2$, and particularly preferably 200 to 600 mJ/cm$^2$.

From the viewpoint of reducing the odor of the cured film, the irradiation intensity is preferably 10 to 1000 mW/cm$^2$, more preferably 30 to 700 mW/cm$^2$, and particularly preferably 50 to 500 mW/cm$^2$.

In addition, the temperature of the recording medium at the time of recording is preferably less than 45° C., more preferably 40° C. or less, and particularly preferably 35° C. or less. By the temperature of the recording medium at the time of recording being within the above range, volatilization of the monomer into the atmosphere after formation of the coating film may be suppressed.

Step of Attaching Radiation-Curable Clear Composition

Since the step of attaching the radiation-curable clear composition is the same as the step of attaching the radiation-curable color composition, other than the point of attaching the radiation-curable clear composition to the attachment region of the radiation-curable color composition, detailed explanation thereof will be omitted. In this step, the radiation-curable clear composition may be attached to a region to which the radiation-curable color composition is not attached.

Curing Step (Light Irradiation Step)

The ink jet recording method of the present embodiment may further have a curing step after the radiation-curable clear composition attachment step. The curing step is a step of curing the radiation-curable clear composition and, as necessary, the radiation-curable color composition, and is the same as the curing step described above, thus, description thereof is omitted.

5. Examples and Comparative Examples

A more detailed description will be given below of the invention with reference to examples, but the invention is not limited to these examples.

5.1. Preparation of Ink Jet Composition

First, in the color compositions shown in Table 1 and Table 2, a coloring material, a dispersing agent, and a part of each monomer were weighed and added to a tank for pigment dispersion, a ceramic bead mill having a diameter of 1 mm was added to the tank, and stirring was carried out to obtain a pigment dispersion in which the coloring material was dispersed in the polymerizable compound. Subsequently, the remaining monomer, polymerization initiator, and ultraviolet absorber were added to a mixture tank, which is a container made of stainless steel, so as to have the compositions described in Tables 1 and 2, and, after mixing and stirring to completely dissolve the mixture, the pigment dispersion obtained as described above was added thereto, mixing and stirring were further carried out for 1 hour at a normal temperature, and filtering was further carried out through a 5 μm membrane filter to obtain the color compositions in Tables 1 and 2. The numerical value of each component in the Tables represents % by mass.

TABLE 1

| Composition No. | | 1 | 2 | 3 | 4 | 5 | 6 | 7 | 8 | 9 | 10 |
|---|---|---|---|---|---|---|---|---|---|---|---|
| Coloring material | Or43 | 3 | 3 | 3 | 3 | 3 | 3 | 4 | 2 | 3 | 3 |
| | Or36 | — | — | — | — | — | — | — | — | — | — |
| | Or64 | — | — | — | — | — | — | — | — | — | — |
| | Dispersing agent | 1 | 1 | 1 | 1 | 1 | 1 | 1 | 1 | 1 | 1 |
| Polymerizable compound | VEEA | 15 | 15 | 15 | 15 | 15 | 15 | 15 | 15 | 20 | 10 |
| | PEA | 33 | 33 | 32.5 | 32.5 | 32.5 | 32.5 | 32 | 34 | 28 | 38 |
| | ACMO | 15 | 10 | 15 | 15 | 15 | 15 | 15 | 15 | 15 | 15 |

TABLE 1-continued

|  |  |  |  |  |  |  |  |  |  |  |
|---|---|---|---|---|---|---|---|---|---|---|
|  | NVC | 15 | 10 | 15 | 15 | 15 | 15 | 15 | 15 | 15 | 15 |
|  | 4-HBA | — | — | — | — | — | — | — | — | — | — |
|  | DPGDA | — | 15 | — | — | — | — | — | — | — | — |
|  | CN991 | 10 | 5 | 10 | 10 | 10 | 10 | 10 | 10 | 10 | 10 |
| Polymerization | Irg819 | 4 | 4 | 4 | 4 | 4 | 4 | 4 | 4 | 4 | 4 |
| initiator | TPO | 4 | 4 | 4 | 4 | 4 | 4 | 4 | 4 | 4 | 4 |
|  | Irg369 | — | — | — | — | — | — | — | — | — | — |
| Ultraviolet | TINUVIN 400 | — | — | 0.5 | — | — | — | — | — | — | — |
| absorber | TINUVIN 405 | — | — | — | 0.5 | — | — | — | — | — | — |
|  | TINUVIN 109 | — | — | — | — | 0.5 | — | — | — | — | — |
|  | TINUVIN 384-2 | — | — | — | — | — | 0.5 | — | — | — | — |
|  | Total | 100 | 100 | 100 | 100 | 100 | 100 | 100 | 100 | 100 | 100 |

| Composition No. | | 11 | 12 | 13 | 14 | 15 | 16 | 17 | 18 |
|---|---|---|---|---|---|---|---|---|---|
| Coloring | Or43 | 3 | 3 | 3 | 3 | 1.5 | 3 | — | — |
| material | Or36 | — | — | — | — | 1.5 | — | 3 | — |
|  | Or64 | — | — | — | — | — | — | — | 3 |
|  | Dispersing agent | 1 | 1 | 1 | 1 | 1 | 1 | 1 | 1 |
| Polymerizable | VEEA | 15 | 15 | 15 | 15 | 15 | 15 | 15 | 15 |
| compound | PEA | 30 | 40 | 30 | 40 | 33 | 36 | 33 | 33 |
|  | ACMO | 18 | 8 | 15 | 15 | 15 | 15 | 15 | 15 |
|  | NVC | 15 | 15 | 18 | 8 | 15 | 15 | 15 | 15 |
|  | 4-HBA | — | — | — | — | — | — | — | — |
|  | DPGDA | — | — | — | — | — | — | — | — |
|  | CN991 | 10 | 10 | 10 | 10 | 10 | 10 | 10 | 10 |
| Polymerization | Irg819 | 4 | 4 | 4 | 4 | 4 | — | 4 | 4 |
| initiator | TPO | 4 | 4 | 4 | 4 | 4 | — | 4 | 4 |
|  | Irg369 | — | — | — | — | — | 5 | — | — |
| Ultraviolet | TINUVIN 400 | — | — | — | — | — | — | — | — |
| absorber | TINUVIN 405 | — | — | — | — | — | — | — | — |
|  | TINUVIN 109 | — | — | — | — | — | — | — | — |
|  | TINUVIN 384-2 | — | — | — | — | — | — | — | — |
|  | Total | 100 | 100 | 100 | 100 | 100 | 100 | 100 | 100 |

TABLE 2

| Composition No. | | 19 | 20 | 21 |
|---|---|---|---|---|
| Coloring material | Y155 | 3 | — | — |
|  | R122 | — | 3 | — |
|  | B15:3 | — | — | 3 |
| Dispersing agent |  | 1 | 1 | 1 |
| Polymerizable | VEEA | 15 | 15 | 15 |
| compound | PEA | 33 | 33 | 33 |
|  | ACMO | 15 | 15 | 15 |
|  | NVC | 15 | 15 | 15 |
|  | 4-HBA | — | — | — |
|  | DPGDA | — | — | — |
|  | CN991 | 10 | 10 | 10 |
| Polymerization | Irg819 | 4 | 4 | 4 |
| initiator | TPO | 4 | 4 | 4 |
|  | Irg369 | — | — | — |
| Ultraviolet absorber | TINUVIN 400 | — | — | — |
|  | TINUVIN 405 | — | — | — |
|  | TINUVIN 109 | — | — | — |
|  | TINUVIN 384-2 | — | — | — |
| Total |  | 100 | 100 | 100 |

Next, for the clear composition shown in Table 3, a monomer, a polymerization initiator and an ultraviolet absorber were added to a mixture tank, which is a container made of stainless steel, so as to have the composition shown in Table 3, mixing and stirring were carried out until the mixture was completely dissolved, mixing and stirring were further carried out for 1 hour at a normal temperature, and filtering was further carried out through a 5 μm membrane filter to obtain the clear composition shown in Table 3. The numerical value of each component in the Tables represents % by mass.

TABLE 3

| Composition No. | | cl1 | cl2 | cl3 | cl4 | cl5 | cl6 | cl7 | cl8 | cl9 | cl10 | cl11 | cl12 |
|---|---|---|---|---|---|---|---|---|---|---|---|---|---|
| Coloring | Or43 | — | — | — | — | — | — | — | — | — | — | — | — |
| material | Or36 | — | — | — | — | — | — | — | — | — | — | — | — |
|  | Or64 | — | — | — | — | — | — | — | — | — | — | — | — |
|  | Dispersing agent | — | — | — | — | — | — | — | — | — | — | — | — |
| Polymerizable | VEEA | 15 | 15 | 15 | 15 | 15 | 15 | 15 | 15 | 15 | 15 | 15 | 15 |
| compound | PEA | 28.5 | 28.5 | 28.5 | 28.5 | 38.5 | 36.5 | 28 | 28.8 | 28.5 | 28.5 | 30.5 | 29 |
|  | ACMO | 15 | 15 | 15 | 15 | 15 | 15 | 15 | 15 | 15 | 15 | 15 | 15 |
|  | NVC | 15 | 15 | 15 | 15 | 15 | 15 | 15 | 15 | 15 | 15 | 15 | 15 |
|  | 4-HBA | 10 | 10 | 10 | 10 | — | — | 10 | 10 | 10 | 10 | 10 | 10 |
|  | DPGDA | — | — | — | — | — | — | — | — | — | — | — | — |
|  | CN991 | 10 | 10 | 10 | 10 | 10 | 10 | 10 | 10 | 10 | 10 | 10 | 10 |

TABLE 3-continued

| Composition No. | | cl1 | cl2 | cl3 | cl4 | cl5 | cl6 | cl7 | cl8 | cl9 | cl10 | cl11 | cl12 |
|---|---|---|---|---|---|---|---|---|---|---|---|---|---|
| Polymerization initiator | Irg819 | 3 | 3 | 3 | 3 | 3 | 4 | 3 | 3 | 3 | 3 | — | 3 |
| | TPO | 3 | 3 | 3 | 3 | 3 | 4 | 3 | 3 | 3 | 3 | — | 3 |
| | Irg369 | — | — | — | — | — | — | — | — | — | — | 4 | — |
| Ultraviolet absorber | TINUVIN 400 | 0.5 | — | — | — | 0.5 | 0.5 | 1 | 0.2 | 0.36 | 0.4 | 0.5 | — |
| | TINUVIN 405 | — | 0.5 | — | — | — | — | — | — | — | — | — | — |
| | TINUVIN 109 | — | — | 0.5 | — | — | — | — | — | 0.14 | 0.1 | — | — |
| | TINUVIN 384-2 | — | — | — | 0.5 | — | — | — | — | — | — | — | — |
| | Total | 100 | 100 | 100 | 100 | 100 | 100 | 100 | 100 | 100 | 100 | 100 | 100 |

The components used in each table are as follows.
Coloring Material
Or 43 (C.I. Pigment Orange 43) (perinone-based pigment)
Or 36 (C.I. Pigment Orange 36)
Or 64 (C.I. Pigment Orange 64)
Y 155 (C.I. Pigment Yellow 155)
R 122 (C.I. Pigment Red 122)
B 15:3 (C.I. Pigment Blue 15:3)
Dispersing Agent
Solsperse 36000 (trade name, manufactured by Lubrizol Corp., polymer dispersing agent).
Polymerizable Compound
VEEA (trade name, manufactured by Nippon Shokubai Co., Ltd., acrylate 2-(2-vinyloxyethoxy)ethyl)
PEA (trade name "Viscoat #192", manufactured by Osaka Organic Chemical Industry Ltd., phenoxyethyl acrylate)
ACMO (trade name, manufactured by KJ Chemicals Corp., acryloyl morpholine)
NVC (trade name "V-CAP", manufactured by ISP Japan, N-vinyl caprolactam)
4-HBA (trade name, manufactured by Osaka Organic Chemical Industry Co., Ltd., 4-hydroxybutyl acrylate)
DPGDA (trade name, manufactured by Daicel-Allnex Ltd., dipropylene glycol diacrylate)
CN 991 (trade name, manufactured by Sartomer Co., Ltd., urethane acrylate oligomer)
Polymerization Initiator
Irg. 819: trade name "IRGACURE 819" manufactured by BASF, bis(2,4,6-trimethylbenzoyl)-phenylphosphine oxide
TPO: trade name "DAROCURE TPO", manufactured by BASF, 2,4,6-trimethylbenzoyl diphenylphosphine oxide
Irg. 369: trade name "IRGACURE 369" manufactured by BASF, (2-benzyl-2-dimethylamino-1-(4-morpholinophenyl)-butanone-1
Ultraviolet Absorber
Tinuvin 400: hydroxyphenyl triazine-based (trade name, manufactured by Ciba Japan)
Tinuvin 405: hydroxyphenyl triazine-based (trade name, manufactured by Ciba Japan)
Tinuvin 109: hydroxyphenyl benzotriazole-based (trade name, manufactured by Ciba Japan)
Tinuvin 384-2: hydroxyphenyl benzotriazole-based (trade name, manufactured by Ciba Japan)

5.2. Evaluation Method
5.2.1. Production of Evaluation Sample

A modified machine of a printer manufactured by Seiko Epson Corp. (SC-S 70650) was used. On the carriage, two heads and light sources on both sides were provided in a staggered arrangement. One head has two nozzle rows, and the nozzle density of each nozzle row is 360 dpi. When the nozzles of the two nozzle rows of one head were projected from the main scanning direction, the nozzles of the other nozzle rows are positioned between the nozzles of one nozzle row so that the nozzle density was 720 dpi in the entire two nozzle rows of one head without the position being overlapped in the sub-scanning direction. In addition, the two heads are arranged to be lined up in the sub-scanning direction such that the nozzles are lined up at positions at equal intervals in the sub-scanning direction and the nozzle intervals are maintained even at the seam of the head in the sub-scanning direction. The distance between the rows in the main scanning direction of two nozzle rows in one head is approximately 1 mm.

Two heads were used, but set such that ink was discharged from only one nozzle row (nozzle density 360 dpi) out of two nozzle rows of one head. The light source was an LED having a peak wavelength of 395 nm and a peak intensity of 500 mW/cm$^2$. The irradiation energy from one light source in one scan (one pass) in the main scanning direction was approximately 100 mJ/cm$^2$. The moving speed of the carriage in the main scanning during recording was set to 508 mm/s.

Next, main scanning and sub-scanning were alternately performed, dots of one dot row in the main scanning direction were formed by two main scans and dots of one dot row in the sub-scanning direction are formed by two sub-scans such that the recording resolution was 720 dpi×720 dpi. The moving distance of the recording medium in the sub-scanning was set to a distance of approximately half of the length of one head in the sub-scanning direction (differing by a distance of 1/720th of an inch), and a dot group was formed at this distance by four main scans. The mass of ink per dot was set to be approximately 10 ng. The ink (the color composition described in the upper part of the composition number in Table 4) which was discharged from the upstream head and attached to the recording medium was irradiated with ultraviolet rays and then the composition (the clear composition described in the lower part of the composition number in Table 4) was discharged from the downstream head and attached to the recording medium. As a recording medium, a vinyl chloride film "5829 R" manufactured by Mactac Co., Ltd., was used.

A post-curing light source (an LED having the same peak wavelength and peak intensity as the lateral light source) is also provided further to the downstream side in the sub-scanning direction than the head on the carriage, and the total irradiation energy was the tack-free energy of the composition used or more, even for the clear composition discharged from the most downstream nozzle.

In addition, in the Examples shown in Table 5, the color composition was discharged as four colors from the upstream head, attached to the recording medium (the color composition described in the upper four rows of the composition number in Table 5), and irradiated with ultraviolet rays, then, the composition (clear composition described in the lowest part of the composition number in Table 5) was discharged from the downstream head and attached to the recording medium, and post-curing was performed.

5.2.2. Evaluation Method

Samples of each of the Examples and Comparative Examples prepared as described above were prepared and the following evaluations were made.

(1) Evaluation of Light Fastness

Evaluation samples obtained by preparing the above evaluation samples were irradiated in an environment of 50° C. for 400 hours at an illuminance output of 320 W/m with a xenon fade meter (manufactured by Toyo Seiki Seisaku-Sho, Ltd., trade name: Suntest XLS +) to conduct a light fastness test. For the hue evaluation, the color of the evaluation sample immediately after preparation (5 minutes after preparation of the evaluation sample) and the color after the light fastness test were measured with a Macbeth CE-7000 spectrophotometer (manufactured by Macbeth), and the coordinates of the L* a* b* color system of the color difference display method specified by CIE were determined. From the measured L* a* b* values, the color difference between the initial color of the printed image and the color after the light fastness evaluation was determined and evaluated according to the following evaluation criteria. The color difference is defined by the following equation.

Color difference: $\Delta E=[(\Delta L^*)^2+(\Delta a^*)^2+(\Delta b^*)^2]^{1/2}$ (Evaluation Criteria)
AA: $\Delta E \leq 2$
A: $2 < \Delta E \leq 5$
A−: $5 < \Delta E \leq 10$
B: $10 < \Delta E$ In a case where the evaluation of the light fastness is A− or better, the effect of the invention is obtained.

(2) Evaluation of Color Developing Property

For the evaluation samples obtained by preparing the evaluation samples described above, the OD value was measured using Spectrolino (manufactured by Gretag Macbeth) and set as an index of color development evaluation.

(Evaluation Criteria)
A: OD value is 1.9 or more
A−: OD value is 1.7 or more and less than 1.9
B: OD value is 1.5 or more and less than 1.7

(3) Evaluation of Initial Color Tone

For the evaluation samples obtained by preparing the evaluation samples described above, the L* a* b* values in the CIE/L* a* b* color system were measured using a commercially available colorimeter (product name "Gretag Macbeth Spectrolino" manufactured by X-Rite Ltd.). For the comparison of the initial color tone, an ink was prepared in which the ultraviolet absorber was replaced with PEA in the color composition and the clear composition used for preparing the evaluation samples and L* a* b* were measured on a similarly printed and cured sample. The color difference ($\Delta E$) from the comparative sample was calculated and evaluated as follows. The color difference is defined by the following equation.

Color difference: $\Delta E=[(\Delta L^*)^2+(\Delta a^*)^2+(\Delta b^*)^2]^{1/2}$ A: $\Delta E \leq 2$
B: $2 < \Delta E \leq 4$ (4) Evaluation of Curability The printing and curing of the composition were carried out as follows. First, a vinyl chloride film "5829 R" manufactured by Mactac Co., Ltd., was affixed on a table of a transport unit configured to transport a test sample in a straight line and transported, and the composition was discharged from the ink jet head along the way, light was applied to the printed sample passing under the irradiator, and the curability at that time was confirmed by a finger touch test. Printing was performed at a resolution of 720 dpi×720 dpi and the composition weight at the time of printing was 14 ng/dot. The temperature of the printed sample at the time of printing was 35° C. The irradiation intensity of the printed surface of the irradiator was 1 W/cm². Printed samples were printed with a size of 1 inch×1 inch. The amount of energy was adjusted by changing the sample transport speed. The composition of each Example and each Comparative Example was irradiated with ultraviolet rays from a UV-LED having a peak wavelength at 395 nm, and the irradiation energy (unit: mJ/cm²) required for curing the composition was measured. The irradiation of ultraviolet rays necessary for curing was performed until a solid print pattern was touched by a finger and no stickiness was felt, and the integrated light amount at that time was measured by an integrated photometer UM-40 (manufactured by Konica Minolta Inc.). The evaluation criteria are as follows. The evaluation results are shown in Tables 4 and 5.

A: integrated light amount is 200 mJ/cm² or less
B: integrated light amount is more than 200 mJ/cm² and 350 mJ/cm² or less
C: Integrated light amount is more than 350 mJ/cm² and 500 mJ/cm² or less
D: Integrated light amount is more than 500 mJ/cm²

(5) Evaluation of Weather Resistance

Using the super xenon weather meter SX 75 (trade name, manufactured by Suga Test Instruments Co., Ltd., 180 mW/m², BPT: 63° C., humidity: 50%), the evaluation samples obtained by preparing the evaluation samples described above were exposed to an energy of 300 MJ/m².

The evaluation sample obtained after the exposure described above was visually observed and the presence or absence of cracks on the coating film surface was confirmed. The evaluation criteria are as follows. The evaluation results are shown in Table 4 and Table 5 below.

AA: No cracking occurred on the coating film surface
A: Cracking occurred in a part of the coating film surface
B: Cracks occurred in the entire coating film surface

TABLE 4

|  | Examples | | | | | | | | | | | | | | |
| --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 | 14 | 15 |
| Composition No. | 1 | 2 | 3 | 4 | 5 | 6 | 7 | 8 | 9 | 10 | 11 | 12 | 13 | 14 | 15 |
|  | cl1 | cl1 | cl1 | cl1 | cl1 | cl1 | cl1 | cl1 | cl1 | cl1 | cl1 | cl1 | cl1 | cl1 | cl1 |
| Light fastness | A | A | AA | AA | AA | AA | A | A | A | A | A | A | A | A | A− |
| Color developing property | A | A | A | A | A | A | A | A | A | A | A | A | A | A | A− |
| Initial color tone | A | A | A | A | A | A | A | A | A | A | A | A | A | A | A |
| Curability | A | A | A | A | B | B | A | A | A | A | A | A | A | A | A |
| Weather resistance | A | B | AA | AA | AA | AA | A | A | A | A | A | A | A | A | A |

TABLE 4-continued

|  | Examples | | | | | | | | | | Comparative Examples | | | |
| --- | --- | --- | --- | --- | --- | --- | --- | --- | --- | --- | --- | --- | --- | --- |
|  | 16 | 17 | 18 | 19 | 20 | 21 | 22 | 23 | 24 | 25 | 1 | 2 | 3 | 4 |
| Composition No. | 1 | 1 | 1 | 1 | 1 | 1 | 1 | 1 | 1 | 16 | 1 | 17 | 18 | 1 |
|  | cl9 | cl10 | cl2 | cl3 | cl4 | cl5 | cl6 | cl7 | cl8 | cl11 | — | cl1 | cl1 | cl12 |
| Light fastness | AA | AA | A | A | A | A | A | AA | A | A | B | B | B | B |
| Color developing property | A | A | A | A | A | A | A | A | A | A | A | B | B | A |
| Initial color tone | A | A | A | A | A | A | B | A | A | B | A | A | A | A |
| Curability | AA | AA | A | B | B | B | A | B | A | B | A | A | A | A |
| Weather resistance | AA | AA | A | A | A | A | A | AA | A | A | B | B | B | B |

TABLE 5

|  | Example 26 |
| --- | --- |
| Composition No. | 1 |
|  | 19 |
|  | 20 |
|  | 21 |
|  | cl1 |
| Light fastness | A |
| Color developing property | A |
| Initial color tone | A |
| Curability | A |
| Weather resistance | A |

5.3. Evaluation Results

Table 4 and Table 5 show the evaluation results of the Examples and Comparative Examples. From Table 4 and Table 5, the ink jet composition sets of Examples 1 to 26 according to the invention had good light fastness and color developing property in images obtained by attaching a radiation-curable clear composition on an attachment region of a radiation-curable color composition.

In contrast, in Comparative Example 1 in which the clear composition was not used, it was not possible to secure the light fastness of POr 43. In addition, in Comparative Examples 2 and 3 in which POr 43 was not used, predetermined color developing properties were not obtained and it was not possible to secure the light fastness. Furthermore, in Comparative Example 4 using a clear composition not including an ultraviolet absorber, it was not possible to secure the light fastness of POr 43.

As seen from the results of the ink jet composition set of the Examples, it is understood from Example 2 that the weather resistance was slightly lowered when a bifunctional or higher functional polymerizable compound was contained. In addition, from Examples 2 to 6, it is understood that better results are obtained when the color composition also contains an ultraviolet absorber. From Example 25, it is understood that the initial color tone and curability are somewhat inferior when using a polymerization initiator other than the acylphosphine oxide-based polymerization initiator. In addition, in Example 21, it is understood that the curability is somewhat worse in a case where 4-HBA is not contained. Then, it is understood that when the initiator was increased as in Example 22, the initial color tone was deteriorated (colored).

With respect to the clear compositions and the color compositions used in Examples 1 to 26, when the absorbance spectrum in the range of 380 nm or more and 430 nm or less was measured by the measuring method described above (the measuring method in a case where the composition and the concentration are known), it was confirmed that the absorbance of the ultraviolet absorber was smaller than the absorbance of the polymerization initiator at the wavelength of 380 nm or more and 430 nm or less in all cases.

The invention is not limited to the embodiments described above, and various modifications are possible. For example, the invention includes a configuration substantially the same as the configuration described in the embodiment (for example, a configuration having the same function, method, and results, or a configuration having the same object and effects). In addition, the invention includes a configuration in which non-essential parts of the configuration described in the embodiment are replaced. In addition, the invention includes a configuration which achieves the same operation and effects as the configuration described in the embodiment, or a configuration which is able to achieve the same object. In addition, the invention includes a configuration in which a publicly-known technique is added to the configuration described in the embodiment.

The entire disclosure of Japanese Patent Application No. 2017-183551, filed Sep. 25, 2017 is expressly incorporated by reference herein.

What is claimed is:

1. An ink jet composition set comprising:
a radiation-curable color composition, which contains a perinone-based pigment, a polymerizable compound and a polymerization initiator; and
a radiation-curable clear composition, which contains an ultraviolet absorber, a polymerizable compound, and a polymerization initiator,
wherein, at a concentration contained in the radiation-curable clear composition, a light absorbance of the ultraviolet absorber at a wavelength of 380 nm or more and 430 nm or less is smaller than a light absorbance of the polymerization initiator in the radiation-curable clear composition.

2. The ink jet composition set according to claim 1, wherein the ultraviolet absorber is one or more kinds selected from hydroxyphenyl benzotriazole, hydroxyphenyl triazine, hydroxybenzophenone, and oxalic anilide.

3. The ink jet composition set according to claim 1, wherein a content of the ultraviolet absorber in the radiation-curable clear composition is 0.1% by mass or more and 10% by mass or less with respect to a total mass of the composition.

4. The ink jet composition set according to claim 1, wherein the radiation-curable color composition contains an ultraviolet absorber.

5. The ink jet composition set according to claim 1, wherein the polymerization initiator in the radiation-curable clear composition is an acylphosphine oxide compound.

6. The ink jet composition set according to claim 1, wherein a content of the polymerization initiator in the radiation-curable color composition is larger than a content of the polymerization initiator in the radiation-curable clear composition.

7. The ink jet composition set according to claim 1, wherein a content of the polymerization initiator in the radiation-curable clear composition is 6% by mass or less.

8. The ink jet composition set according to claim 1, wherein a hydroxyl group-containing monofunctional (meth)acrylate is contained as the polymerizable compound in the radiation-curable clear composition.

9. The ink jet composition set according to claim 1, wherein a monomer represented by General Formula (I) is contained as the polymerizable compound in the radiation-curable color composition, $$CH_2=CR^1-COOR^2-O-CH=CH-R^3 \quad (I)$$

and, in Formula (I), $R^1$ is a hydrogen atom or a methyl group, $R^2$ is a divalent organic residue having 2 to 20 carbon atoms, and $R^3$ is a hydrogen atom or a monovalent organic residue having 1 to 11 carbon atoms.

10. The ink jet composition set according to claim 1, wherein hydroxyphenyl benzotriazole and hydroxyphenyl triazine are included as the ultraviolet absorber in the radiation-curable clear composition, and a content ratio of the hydroxyphenyl benzotriazole and hydroxyphenyl triazine is a mass ratio of 2 or more and 4 or less of hydroxyphenyl triazine with respect to 1 of hydroxyphenyl benzotriazole.

11. The ink jet composition set according to claim 1, wherein, as the polymerizable compound in the radiation-curable color composition, a monofunctional (meth)acrylate is contained in a total of 40% by mass or more with respect to a total mass of the composition.

12. The ink jet composition set according to claim 1, wherein the polymerizable compound in the radiation-curable color composition is a bifunctional or higher functional (meth)acrylate, and a content of the bifunctional or higher functional (meth)acrylate is 20% by mass or less with respect to the total mass of the radiation-curable color composition.

13. The ink jet composition set according to claim 1, further comprising:
a radiation-curable color composition, which contains one or more kinds selected from C.I. Pigment Yellow 155, C.I. Pigment Yellow 74, and C.I. Pigment Yellow 150, a polymerizable compound, and a polymerization initiator;
a radiation-curable color composition, which contains C.I. Pigment Red 122, a polymerizable compound, and a polymerization initiator; and
a radiation-curable color composition, which contains C.I. Pigment Blue 15:3, a polymerizable compound, and a polymerization initiator.

14. An ink jet recording method comprising:
attaching the radiation-curable color composition according to claim 1 and then attaching the radiation-curable clear composition to an attachment region of the radiation-curable color composition.

15. An ink jet recording method comprising:
attaching the radiation-curable color composition according to claim 2 and then attaching the radiation-curable clear composition to an attachment region of the radiation-curable color composition.

16. An ink jet recording method comprising:
attaching the radiation-curable color composition according to claim 3 and then attaching the radiation-curable clear composition to an attachment region of the radiation-curable color composition.

17. An ink jet recording method comprising:
attaching ng the radiation-curable color composition according to claim 4 and then attaching the radiation-curable clear composition to an attachment region of the radiation-curable color composition.

18. An ink jet recording method comprising:
attaching ng the radiation-curable color composition according to claim 5 and then attaching the radiation-curable clear composition to an attachment region of the radiation-curable color composition.

19. An ink jet composition set comprising:
a radiation-curable color composition, which contains a perinone-based pigment, a polymerizable compound and a polymerization initiator; and
a radiation-curable clear composition, which contains an ultraviolet absorber, a polymerizable compound, and a polymerization initiator,
wherein hydroxyphenyl benzotriazole and hydroxyphenyl triazine are included as the ultraviolet absorber in the radiation-curable clear composition, and a content ratio of the hydroxyphenyl benzotriazole and hydroxyphenyl triazine is a mass ratio of 2 or more and 4 or less of hydroxyphenyl triazine with respect to 1 of hydroxyphenyl benzotriazole.

* * * * *